(12) United States Patent
Yun et al.

(10) Patent No.: US 10,879,979 B2
(45) Date of Patent: Dec. 29, 2020

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,258

(22) PCT Filed: Mar. 28, 2019

(86) PCT No.: PCT/KR2019/003628
§ 371 (c)(1),
(2) Date: Jul. 5, 2019

(87) PCT Pub. No.: WO2019/198955
PCT Pub. Date: Oct. 17, 2019

(65) Prior Publication Data
US 2019/0326972 A1 Oct. 24, 2019

(30) Foreign Application Priority Data

Apr. 12, 2018 (KR) .................. 10-2018-0042620

(51) Int. Cl.
*H04B 7/06* (2006.01)
*H04B 7/0413* (2017.01)
*H04W 84/12* (2009.01)

(52) U.S. Cl.
CPC ......... *H04B 7/0617* (2013.01); *H04B 7/0413* (2013.01); *H04B 7/0619* (2013.01); *H04W 84/12* (2013.01)

(58) Field of Classification Search
CPC ... H04B 7/0617; H04B 7/0619; H04B 7/0413
See application file for complete search history.

(56) References Cited

U.S. PATENT DOCUMENTS

| | | | |
|---|---|---|---|
| 2011/0199968 A1* | 8/2011 | Kim ..................... | H04B 7/0617 370/328 |
| 2012/0026909 A1* | 2/2012 | Seok .................... | H04B 7/0417 370/252 |

(Continued)

FOREIGN PATENT DOCUMENTS

| | | | | |
|---|---|---|---|---|
| KR | 20150118897 A | * | 10/2015 | ............... H04B 7/06 |
| KR | 20160087743 A | * | 7/2016 | ............. H04L 27/26 |

(Continued)

OTHER PUBLICATIONS 802.11 Working Group of the LAN/MAN Standards Committee of the IEEE Computer Society, "P802.11ay™/D3.0 Draft Standard for Information Technology-Telecommunications and Information Exchange Between Systems—Local and Metropolitan Area", Feb. 2019, IEEE. (Year: 2019).*

(Continued)

*Primary Examiner* — Peter P Chau
(74) *Attorney, Agent, or Firm* — Lee, Hong, Degerman, Kang & Waimey PC

(57) ABSTRACT

Proposed are a method and apparatus for transmitting a feedback frame in a wireless LAN (WLAN) system. Specifically, a first station (STA) generates a feedback frame based on a multi input multi output (MIMO) beamforming procedure. The first STA transmits the feedback frame to a second STA. The feedback frame is transmitted through an aggregated channel in which a first channel and a second channel are aggregated. The feedback frame includes a first beamforming feedback matrix transmitted on the first channel and a second beamforming feedback matrix transmitted on the second channel. The feedback frame includes a third (Continued)

beamforming feedback matrix when the feedback frame is not transmitted through the aggregated channel. The number of columns of the third beamforming feedback matrix is set to Nc, and the number of rows of the third beamforming feedback matrix is set to Nr. Nc is determined based on the total number of spatial streams supported by the first STA. The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2.

15 Claims, 21 Drawing Sheets

(56) References Cited

U.S. PATENT DOCUMENTS

| | | | |
|---|---|---|---|
| 2017/0033898 A1* | 2/2017 | Chun | H04W 84/12 |
| 2017/0111148 A1* | 4/2017 | Park | H04L 5/0048 |
| 2017/0156148 A1* | 6/2017 | Park | H04L 5/0048 |
| 2017/0171860 A1* | 6/2017 | Park | H04W 72/0453 |
| 2017/0171878 A1* | 6/2017 | Chun | H04L 27/26 |
| 2017/0272138 A1* | 9/2017 | Chun | H04L 29/08 |
| 2017/0303280 A1* | 10/2017 | Chun | H04L 1/1614 |
| 2020/0099428 A1* | 3/2020 | Ciochina | H04B 7/0626 |

FOREIGN PATENT DOCUMENTS

| | | | | |
|---|---|---|---|---|
| KR | 20170117445 A | * | 10/2017 | H04L 1/0075 |
| WO | 2013077651 | | 5/2013 | |
| WO | 2017196900 | | 11/2017 | |

OTHER PUBLICATIONS

PCT International Application No. PCT/KR2019/003628, International Search Report dated Jul. 3, 2019, 3 pages.

Oteri, K. et al., "Hybrid Beamforming Feedback in 802.11ay", doc.: IEEE 802.11-18/0192r1, Jan. 2018, 15 pages.

Ciochina, D. et al., "Digital Beamforming Feedback Format", doc.: IEEE 802.11-18/0503r0, Mar. 2018, 16 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 16

| Nc Index | Nr Index | Tx Antenna Mask | Ncb | Grouping | Codebook Information | Feedback Type | Number of Feedback Matrices or Feedback Taps |
|---|---|---|---|---|---|---|---|
| 3 | 3 | 8 | 2 | 2 | 1 | 1 | 10 |

Bits:

SIGNAL TRANSMISSION/RECEPTION METHOD IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2019/003628, filed on Mar. 28, 2019, which claims the benefit of earlier filing date and right of priority to Korean Patent Application No. 10-2018-0042620, filed on Apr. 12, 2018, the contents of which are all hereby incorporated by reference herein in their entireties.

BACKGROUND OF THE INVENTION

Field of the Invention

The present specification relates to a technique for transmitting/receiving a signal in a wireless local area network (LAN) system, and more particularly, to a method and apparatus for transmitting a feedback frame by performing multi input multi output (MIMO) beamforming.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present specification proposes a method and apparatus for transmitting a feedback frame by performing multi input multi output (MIMO) beamforming in a wireless local area network (WLAN) system.

The present specification propose a method and apparatus for transmitting a feedback frame to perform MIMO beamforming.

In the present embodiment, a hybrid beamforming procedure in a channel aggregation situation is defined. Specifically, a method is proposed in which the number of bits used for a feedback of channel information is defined in a channel aggregation situation by distinguishing a single carrier (SC) mode and an orthogonal frequency division multiplexing (OFDM) mode when performing digital beamforming.

First, summarizing terminologies, a first STA may correspond to a responder performing MIMO beamforming, and a second STA may correspond to an initiator performing MIMO beamforming. The MIMO beamforming described in the present embodiment may correspond to single user (SU)-MIMO beamforming if the first STA is a single device, and may correspond to multi-user (MU)-MIMO beamforming if the first STA is a plurality of devices.

The first STA generates a feedback frame based on a MIMO beamforming procedure. The MIMO beamforming procedure may also include a sounding procedure for transmitting/receiving a BRP (beam refinement protocol or beam refinement phase) packet.

The first STA transmits the feedback frame to the second STA.

The frame feedback may be defined as follows.

The feedback frame is transmitted through an aggregated channel in which a first channel and a second channel are aggregated. The feedback frame includes a first beamforming feedback matrix transmitted on the first channel and a second beamforming feedback matrix transmitted on the second channel. That is, a beamforming feedback matrix may be defined for each aggregated channel.

When the feedback frame is not transmitted through the aggregated channel, the feedback frame includes a third beamforming feedback matrix. That is, in case of normal transmission other than channel aggregation, the feedback frame may include the third beamforming feedback matrix.

In this case, the number Nc of columns of the third beamforming feedback matrix and the number Nr of rows are determined based on the total number of spatial streams supported by the first STA. The spatial stream may be determined based on a transmit antenna or transmit chain supported by the first STA, or may be determined based on a receive antenna or receive chain supported by the second STA.

The first beamforming feedback matrix transmitted on the first channel and the second beamforming feedback matrix transmitted on the second channel are configured as follows.

The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2. In this case, Nc and Nr are even numbers.

That is, the present embodiment proposes a method in which a size of the first beamforming feedback matrix transmitted on the first channel and a size of the second beamforming feedback matrix transmitted on the second channel are set to half of a size of the third beamforming feedback matrix. In other words, the present embodiment proposes a method in which a first half of the number of transmit channels supported by the first STA is used for transmission of the first channel, and the other half of the number of transmit chains supported by the first STA is used for transmission of the second channel. Since the half is used, the number of transmit chains, the number of spatial streams, the number of columns of the first and second beamforming feedback matrixes, and the number of rows of the first and second beamforming feedback matrixes shall be even numbers.

The number of feedback bits of the first and second beamforming feedback matrixes may be determined based on a feedback type.

If the feedback type is a single carrier (SC) mode, the number of feedback bits of the first beamforming feedback matrix may be 2×8×(Nc/2)×(Nr/2). The number of feedback bits of the second beamforming feedback matrix may be 2×8×(Nc/2)×(Nr/2). That is, the number of feedback bits can be decreased by decreasing the size of the feedback matrix by using Nc/2 and Nr/2.

If the feedback type is an orthogonal frequency division multiplexing (OFDM) mode, the number of feedback bits of the first beamforming feedback matrix may be Na×(b$\varphi$+b$\psi$)/2. The number of feedback bits of the second beamforming feedback matrix may be Na×(b$\varphi$+b$\psi$)/2. Na is the number of matrix angles of the first and second beamforming feedback matrixes. b$\varphi$ and b$\psi$ are the number of bits for quantizing the matrix angles.

Na varies depending on the size of the beamforming feedback matrix. In general, when the size of the beamforming feedback matrix is small, the value of Na may also be small. That is, the size of the feedback matrix is decreased by using Nc/2 and Nr/2, and thus the value of Na is also decreased, thereby decreasing the number of feedback bits.

b$\varphi$ may be the number of bits used to quantize $\varphi$ defined by a Codebook Information field included in a MIMO Feedback Control element. b$\psi$ may be the number of bits used to quantize $\psi$ defined by the Codebook Information field included in the MIMO Feedback Control element.

A subfield for the feedback type may be included in Digital Fbck Control field.

If the feedback type is an SC mode, the first and second beamforming feedback matrixes may be feedback matrixes which are not compressed in a time domain.

If the feedback type is an OFDM mode, the first and second beamforming feedback matrixes may be feedback matrixes which are compressed in a frequency domain.

Nc may be determined based on an Nc index subfield in the Digital Fbck Control field. Nr may be determined based on an Nr index subfield in the Digital Fbck Control field.

The first channel may be 2.16 GHz and the second channel may be 2.16 GHz (2.16 GHz+2.16 GHz). Alternatively, the first channel may be 4.32 GHz and the second channel may be 4.32 GHz (4.32 GHz+4.32 GHz). The first channel and the second channel have different bands. The first channel and the second channel may be contiguous or non-contiguous to each other.

An embodiment proposed in the present specification can decrease a feedback bit for channel information by reducing a size of a feedback matrix by half in a channel association situation. Accordingly, channel state information can be effectively fed back in a hybrid beamforming process.

BRIEF DESCRIPTION OF THE DRAWINGS

FIG. 9 is a diagram showing a PPDU structure that can be applied to the present invention.

FIG. 16 shows a digital Fbck control field according to an embodiment of the present specification.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
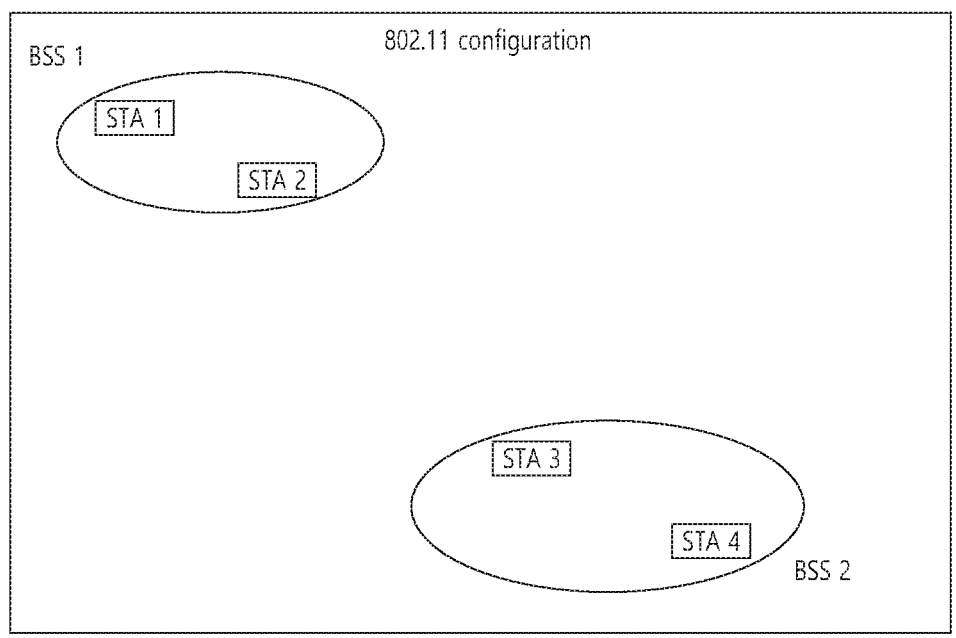
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
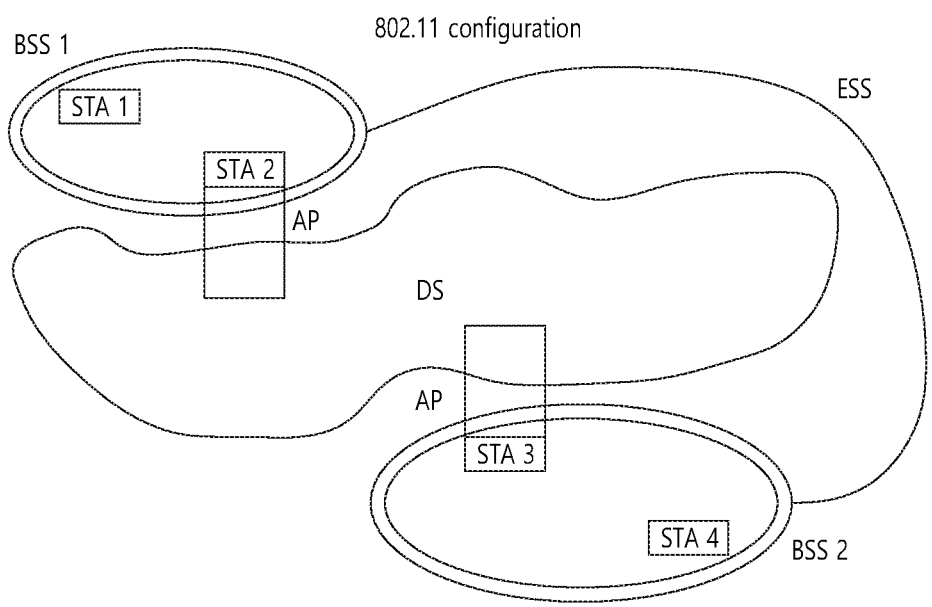
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
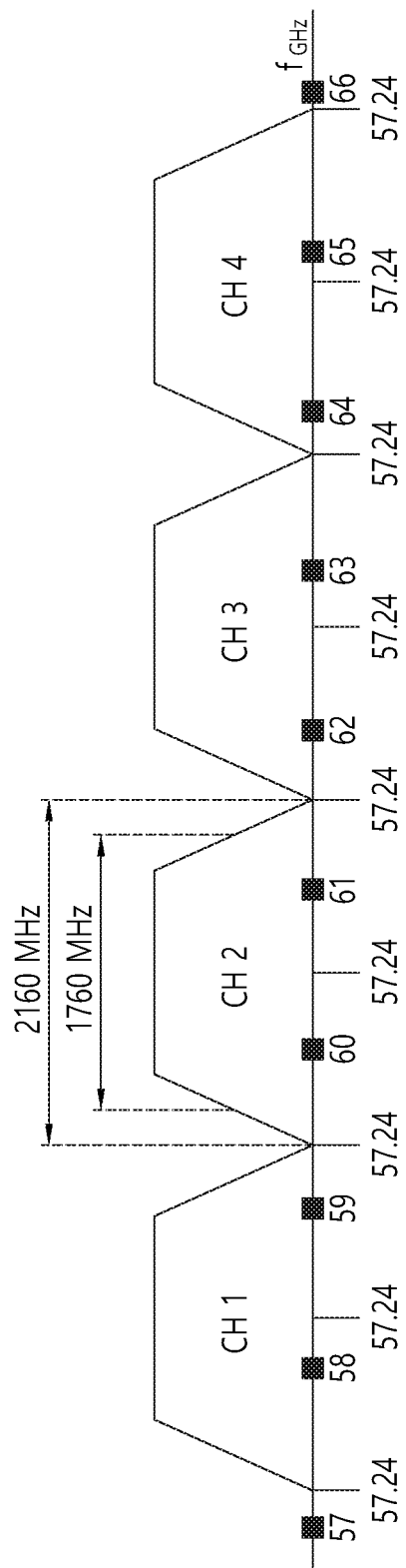
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
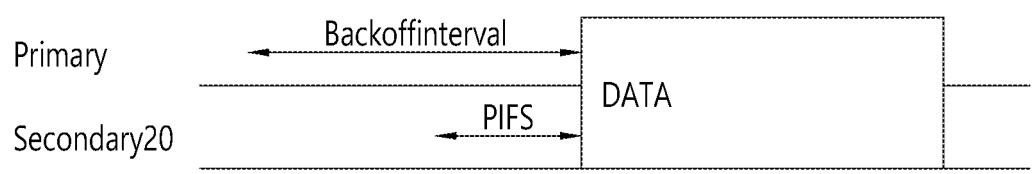
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
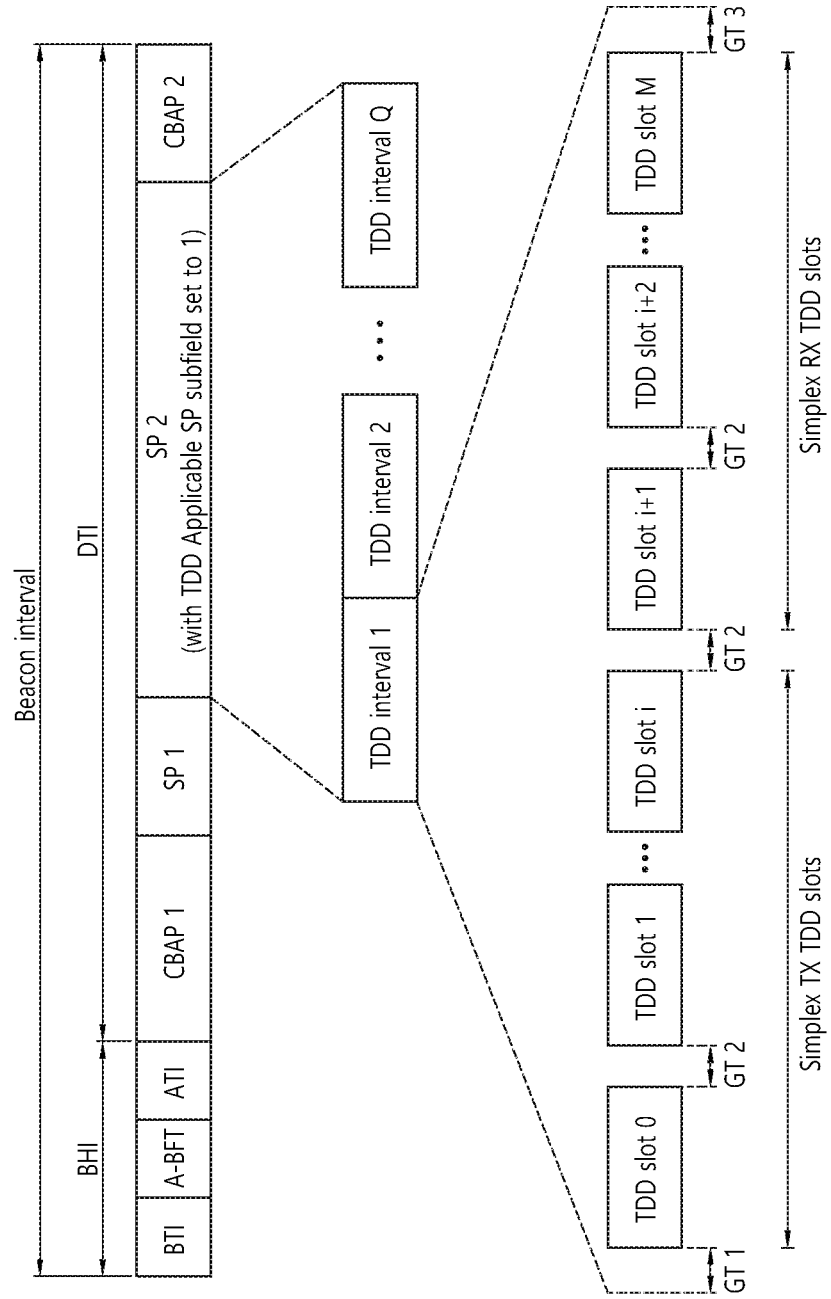
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

FIG. 5 shows a structure of a TDD service period (SP). The TDD SP consists of one or more consecutive and adjacent TDD intervals (TDD interval 1, TDD interval 2, . . . , TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, . . . , TDD slot i), and the responder may receive data (or a frame) from the initiator in an RX TDD slot (TDD slot i+1, TDD slot i+2, TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY (SC PHY) | 1 . . . 12 25 . . . 31 | (low power SC PHY) |
| OFDM PHY | 13 . . . 24 | |

Figure 6:
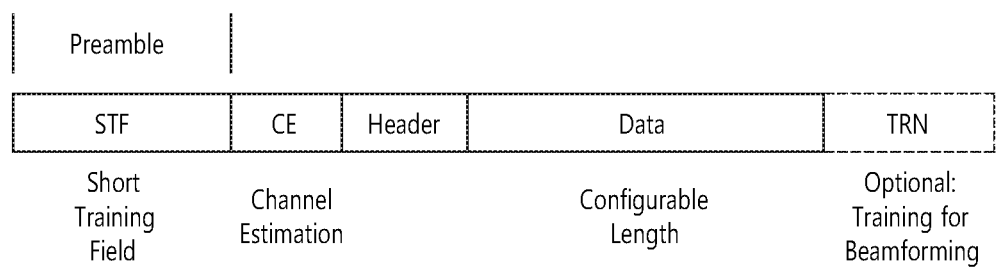
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
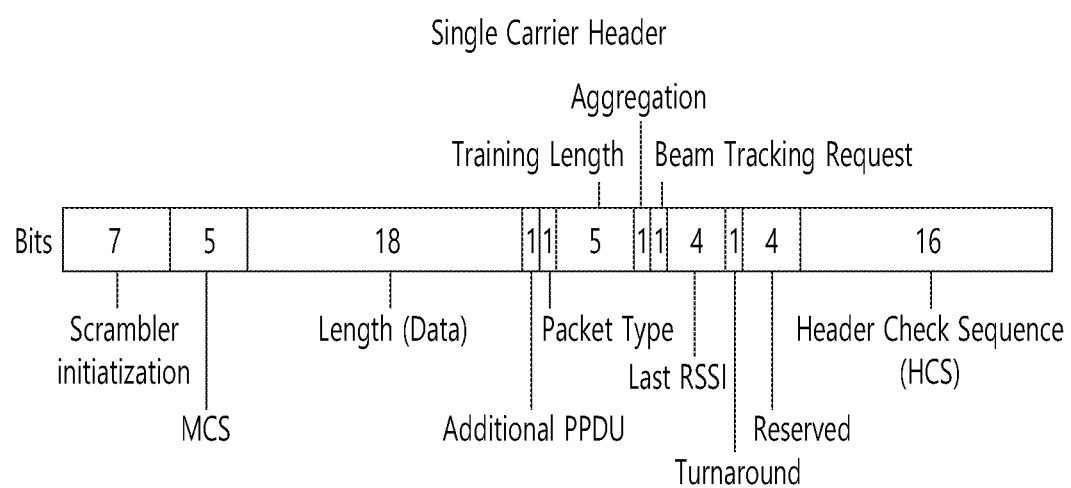
FIG. 7 and FIG. 8 are diagrams describing a configuration of a header field of the radio frame shown in FIG. 6.
Figure 8:
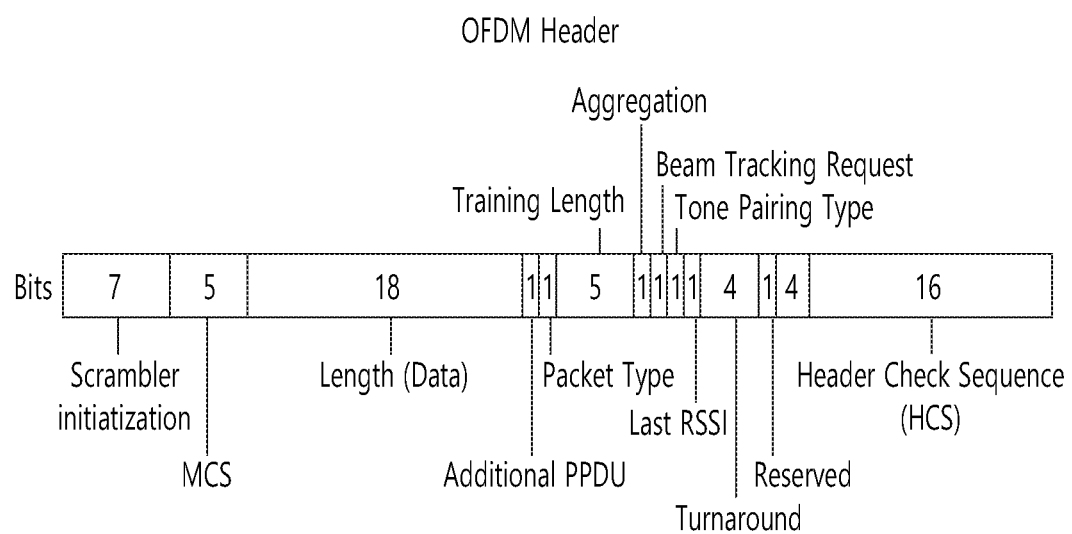

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
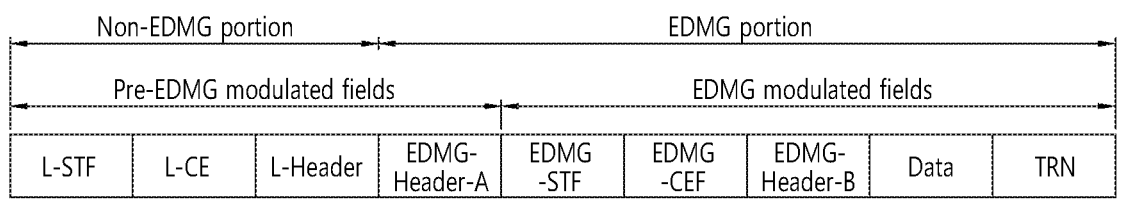
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
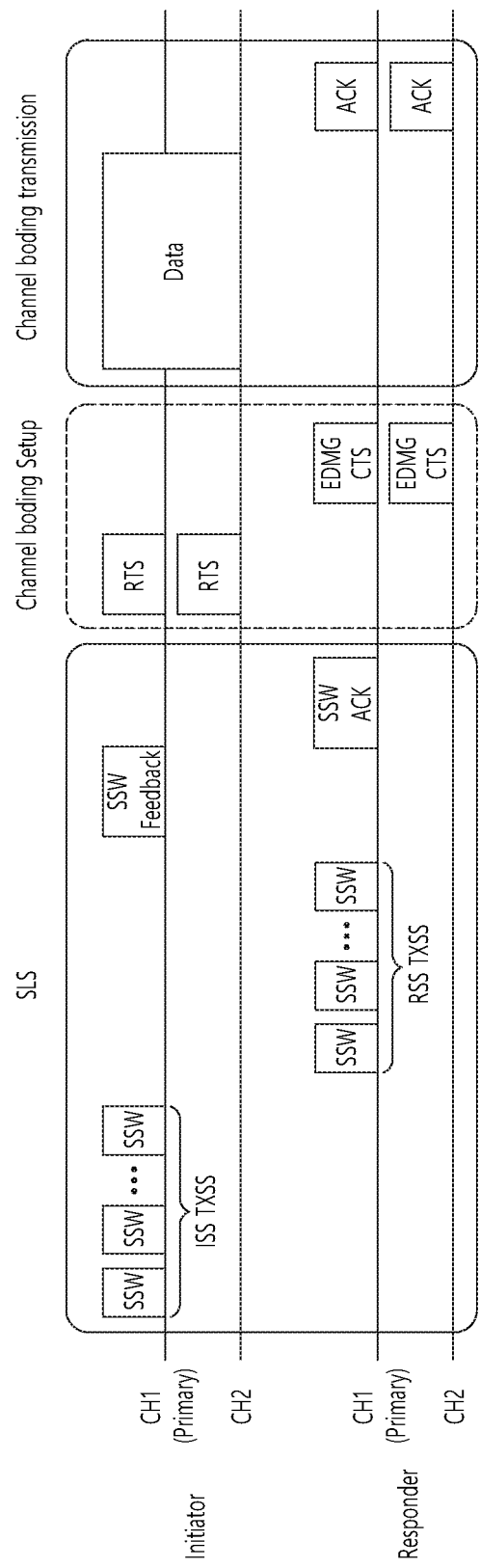
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
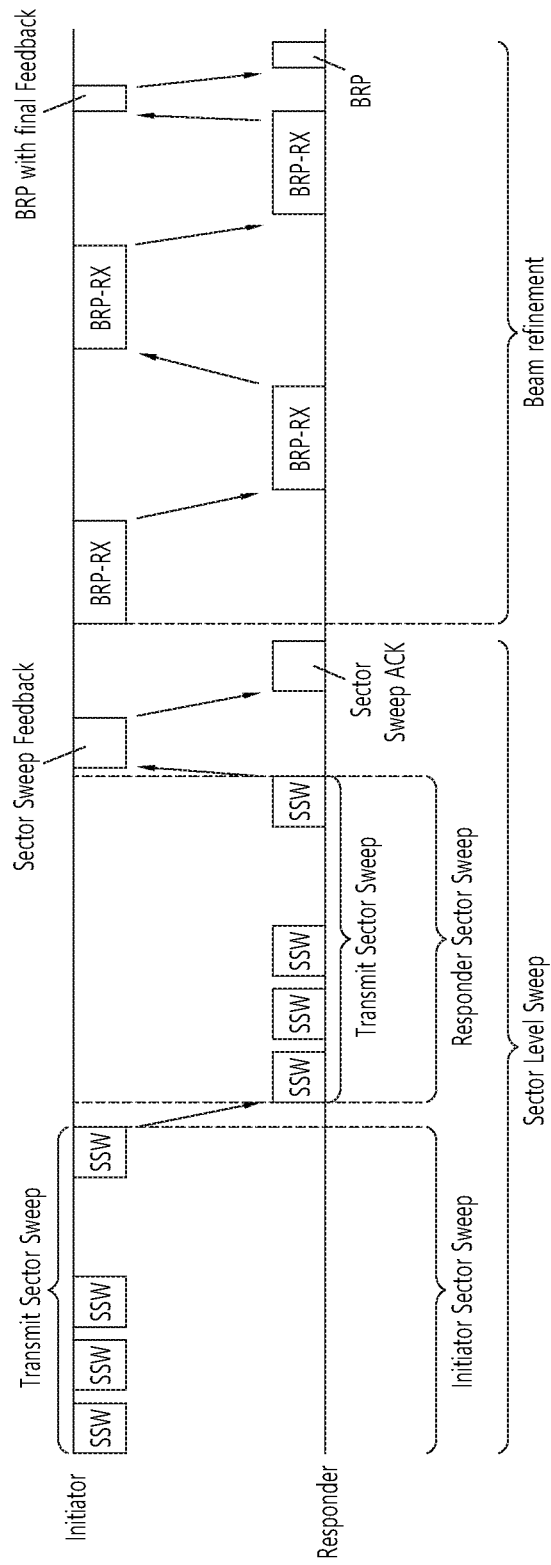
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
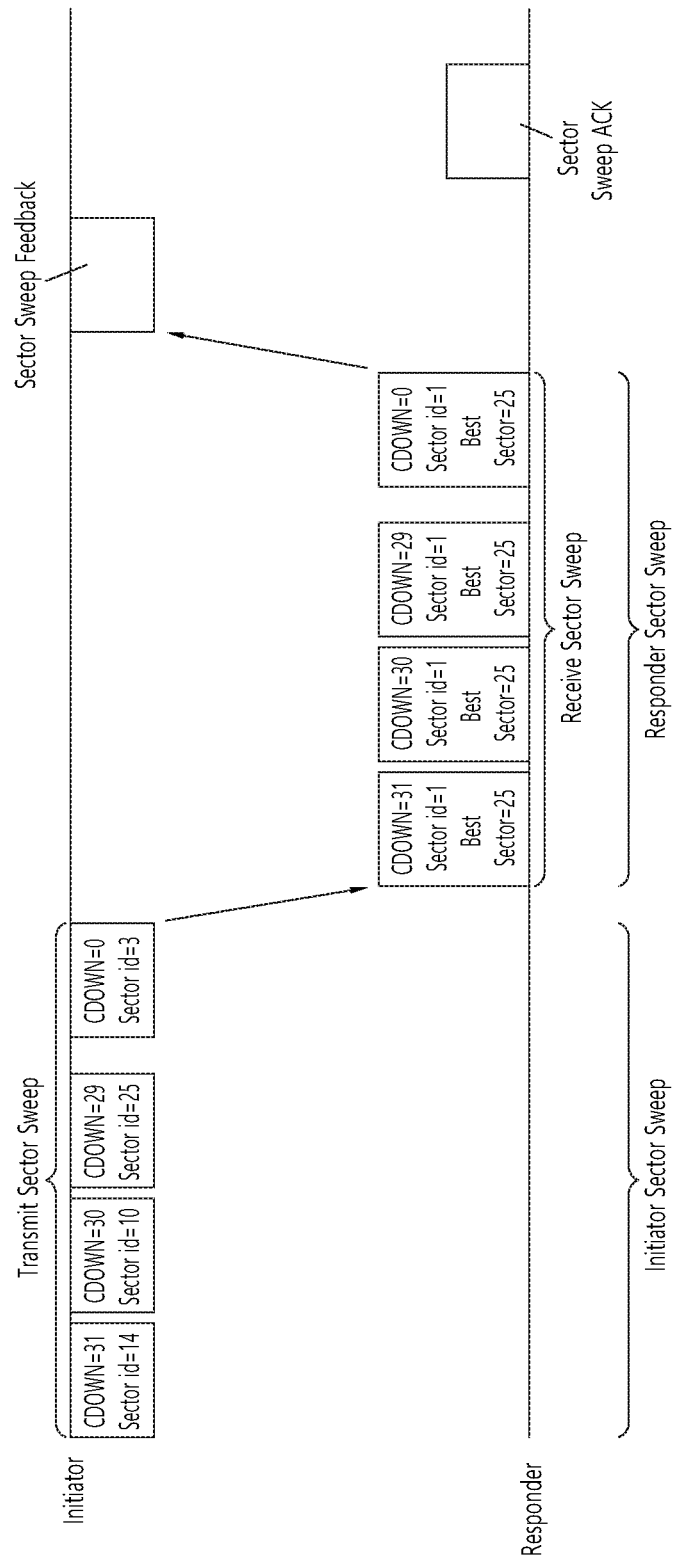
FIG. 13 and FIG. 14 is a diagram showing examples of a Sector Level Sweep (SLS) phase.
Figure 14:
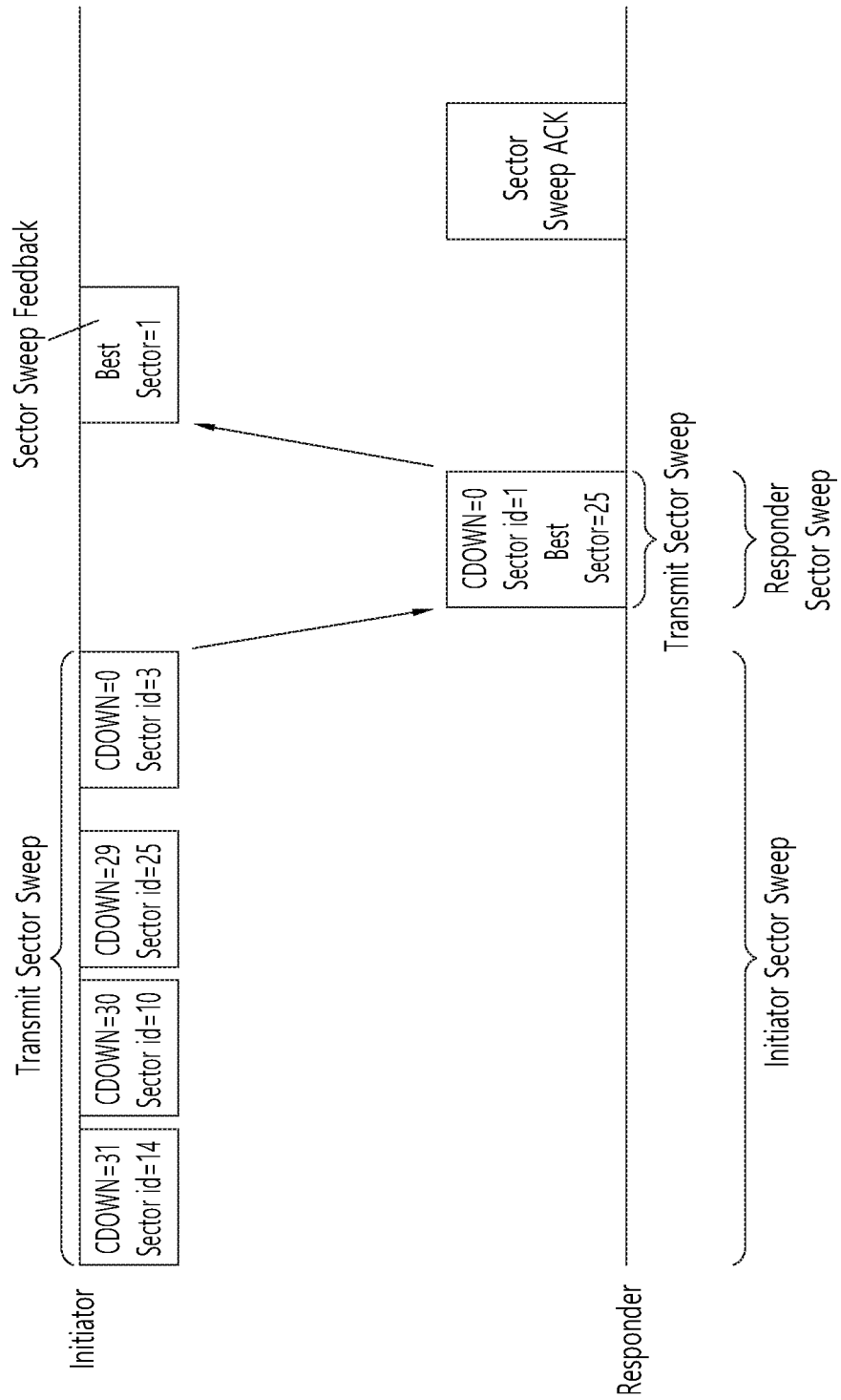

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2 Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3 Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. Embodiment Applicable to the Present Invention

During a hybrid beamforming procedure, a compressed beamforming feedback process feeds back subcarriers by determining grouping (Ng=2, 4, 8) instead of feeding back all subcarriers. In IEEE 802.11ay, a dynamic grouping technique is also proposed in addition to the feedback performed by determining a group value. Dynamic grouping is a scheme in which the feedback is performed by flexibly changing a subcarrier grouping value according to a channel situation without having to perform the feedback with an interval of Ng when performing the feedback. A technique for a tone index is proposed when the dynamic grouping is performed in this manner.

Hereinafter, hybrid beamforming will be described.

An EDMG STA is capable of hybrid beamforming. Specifically, the hybrid beamforming is possible when one (or both) of a hybrid beamforming and SU-MIMO supported subfield included in an EDMG capabilities element of the STA and a hybrid beamforming and MU-MIMO supported subfield included in the EDMG capabilities element of the STA is 1.

Alternatively, when the hybrid beamforming and SU-MIMO supported subfield is 1 in the EDMG capability element of the STA, the STA capable of hybrid beamforming is capable of hybrid beamforming and SU-MIMO. The STA capable of hybrid beamforming may be capable of hybrid beamforming and MU-MIMO when the hybrid beamforming and MU-MIMO supported subfield of the hybrid beamforming and the EDMG capability element of the STA is 1.

The STA capable of hybrid beamforming supports a hybrid beamforming protocol

The hybrid beamforming represents transmission/reception of multi-spatial streams which use a combination of analog beamforming (by determining proper AWB) and digital beamforming (by determining a proper spatial mapping matrix) between an initiator capable of SU-MIMO and a responder capable of SU-MIMO or between an initiator capable of MU-MIMO and at least one responder capable of MU-MIMO. The spatial mapping matrix is determined based on a DMG antenna structure selected as a result of an SU-MIMO or MU-MIMO beamforming protocol The hybrid beamforming protocol supports digital baseband training and hybrid beamforming information feedback for next hybrid beamforming transmission.

The hybrid beamforming may be used to support transmission of a single spatial stream which uses multi-DMG antennas together with a combination of analog beamforming and digital beamforming between an initiator capable of SU-MIMO and a responder capable of SU-MIMO.

AWV of a DMG antenna may be selected by using an SU-MIMO beamforming protocol or an MU-MIMO beamforming protocol, which enables to determine an antenna structure for simultaneous transmission of a single or multi-spatial stream from the initiator to the responder(s) (the other way around is also possible in case of SU-MIMO).

In the hybrid beamforming protocol, a transmitting device acquires hybrid beamforming information based on a feedback from a receiving device, induced from a channel direction between the transmitting device and the receiving device.

Figure 15:
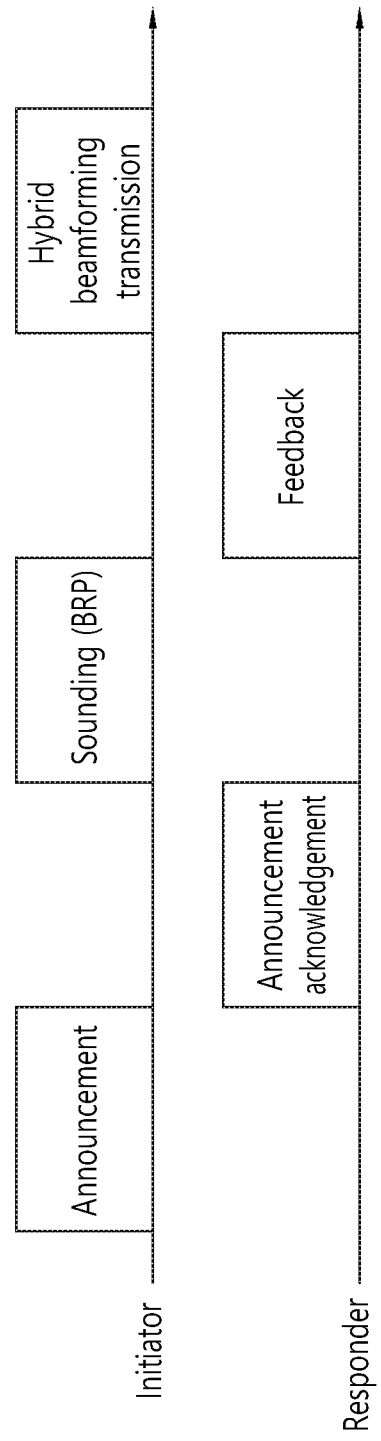
FIG. 15 shows an SU-MIMO hybrid beamforming procedure according to an embodiment of the present specification.

FIG. 15 shows an SU-MIMO hybrid beamforming procedure according to an embodiment of the present specification.

Referring to FIG. 15, hybrid beamforming includes an announcement phase, a sounding phase, and a feedback phase. The announcement phase may be skipped when a beamforming configuration is predetermined.

A MIMO feedback control element proposed in the present embodiment is used to transfer configuration information for a channel measurement feedback element, an EDMG channel measurement feedback element, and/or a digital beamforming feedback element. The MIMO feedback control element includes a digital Fbck control field.

FIG. 16 shows a digital Fbck control field according to an embodiment of the present specification.

Referring to FIG. 16, the digital Fbck control field includes subfields of Nc Index, Nr Index, Tx Antenna Maxk, Ncb, Grouping, Codebook Information, Feedback Type, Number of Feedback Matrices or Feedback Taps. Each subframe included in the digital Fbck control field is described in the following table.

TABLE 2

| Subfield | Meaning |
| --- | --- |
| Nc Index | Indicates the number of columns, Nc, in the beamforming feedback matrix minus one:<br>Set to 0 for Nc = 1<br>Set to 1 for Nc = 2<br>Set to 2 for Nc = 3<br>Set to 3 for Nc = 4<br>Set to 4 for Nc = 5<br>Set to 5 for Nc = 6<br>Set to 6 for Nc = 7<br>Set to 7 for Nc = 8 |

TABLE 2-continued

| Subfield | Meaning |
|---|---|
| Nr Index | Indicates the number of rows, Nr, in a beamforming feedback matrix minus one:<br>Set to 0 for Nr = 1<br>Set to 1 for Nr = 2<br>Set to 2 for Nr = 3<br>Set to 3 for Nr = 4<br>Set to 4 for Nr = 5<br>Set to 5 for Nr = 6<br>Set to 6 for Nr = 7<br>Set to 7 for Nr = 8 |
| Tx Antenna Mask | Indicates the Tx Antennas reported in the accompanying Digital BF Feedback element. If the CSI for the $i^{th}$ Tx Antenna is included in the accompanying Digital BF feedback element, the $i^{th}$ bit in Tx Antenna Mask is set to 1. Otherwise, the $i^{th}$ bit in Tx Antenna Mask is set to 0. |
| Ncb | Indicates the number of contiguous 2.16 GHz channels the measurement was made for minus one:<br>Set to 0 for 2.16 GHz<br>Set to 1 for 4.32 GHz<br>Set to 2 for 6.48 GHz<br>Set to 3 for 8.64 GHz |
| Grouping | Indicates the subcarrier grouping, Ng, used for beamforming feedback matrix<br>Set to 0 for $N_g = 2$<br>Set to 1 for $N_g = 4$<br>Set to 2 for $N_g = 8$<br>Set to 3 for dynamic grouping; reserved if dynamic grouping is not supported<br>If the Feedback Type subfield is 0, the Grouping subfield is reserved. |
| Codebook Information | Indicates the size of codebook entries.<br>If the SU/MU field in the MIMO Feedback Control element is 1:<br>Set to 0 for 6 bits for $\Psi$, 4 bits for $\phi$<br>Value 1 is reserved<br>If the SU/MU field in the MIMO Feedback Control element is 0:<br>Set to 0 for 9 bits for $\Psi$, 7 bits for $\phi$<br>Value 1 is reserved |
| Feedback Type | Indicates which type of feedback is provided. Set to 0 for uncompressed beamforming feedback in time domain (EDMG SC mode) and set to 1 for compressed using Givens-Rotation in frequency domain (EDMG OFDM mode). |
| Number of Feedback Matrices or Feedback Taps | This field is represented by the variable Nsc.<br>If the Feedback Type subfield is 0, Nsc is the number of feedback taps per element of the SC feedback matrix.<br>If the Feedback Type subfield is 1 and the Grouping subfield is less than 3, Nsc is determined by Table 29.<br>If the Feedback Type subfield is 1 and the Grouping subfield is 3, Nsc specifies the number of subcarriers present in the Digital Beamforming Feedback Information field of the Digital BF Feedback element minus one. |

A digital beamforming (BF) feedback element is transmitted in a MIMO BF feedback frame, and transfers feedback information in a form of a beamforming feedback matrix and differential SNRs. The feedback information may be used by a transmission beam-former to determine a digital BF adjustment matrix Q. When the digital BF feedback element is transmitted in the MIMO BF feedback frame, an SNR field in a channel measurement feedback element is interpreted as a per-stream average SNR.

A size and configuration of the digital BF feedback element differ depending on a field value included in the MIMO feedback control element transmitted in the same frame which transmits the digital BF feedback element.

Accordingly, a reference of all fields existing in the MIMO feedback control element represents an element transmitted in the same frame which transfers the digital BF feedback element.

When a feedback type subfield in the digital Fbck control field is 0, a digital BF feedback information field of the digital BF feedback element includes Nsc digital beamforming matrices. When Nsc>1, a tap delay field indicating a tap corresponding to each digital beamforming matrix is additionally present. Digital beamforming information in a time domain may be represented by a matrix function V.

The digital BF feedback element may be defined by the following table.

TABLE 3

| Field | Size | Meaning |
|---|---|---|
| Element ID | 8 bits | |
| Length | 8 bits | |
| Element ID Extension | 8 bits | |
| Digital Beamforming Feedback Information | Digital Beamforming Feedback Matrix 1 | $n_{bit}$ bits If Feedback Type subfield is 0, represents the beamforming matrix in time domain for the $1^{st}$ tap as described above.<br>If Feedback Type subfield is 1, represents the beamforming matrix for the $1^{st}$ subcarrier, indexed by matrix angles in the order shown in Table 27 |
| | . . . | . . . . |

TABLE 3-continued

| Field | | Size | Meaning |
|---|---|---|---|
| | Digital Beamforming Feedback Matrix $N_{SC}$ | $n_{bit}$ bits | If Feedback Type subfield is 0, represents the beamforming matrix in time domain for the $N_{SC}{}^{th}$ tap as described above. If Feedback Type subfield is 1, represents the beamforming matrix for the $N_{SC}{}^{th}$ subcarrier, indexed by matrix angles in the order shown in Table 27 |
| Differential Subcarrier Index | Differential subcarrier index scidx(0)-scidx(1) | 3 bits | When Grouping subfield is 3, this field represents the number of subcarriers between scidx(0) and scidx(1). Otherwise, it is not present. It is set to j to indicate the distance between the scidx(0) and scidx(1) is $2^j$ Set to 0 to indicate 1 Set to 1 to indicate 2 Set to 2 to indicate 4 Set to 3 to indicate 8 Set to 4 to indicate 16 Set to 5 to indicate 32 Values 6 and 7 are reserved. |
| | . . . | . . . | |
| | Differential subcarrier index scidx($N_{SC}$ − 1)-scidx($N_{SC}$) | 3 bits | When Grouping subfield is 3, this field represents the number of subcarriers between scidx($N_{SC}$ − 1) and scidx($N_{SC}$). Otherwise it is not present. It is set to j to indicate the distance between the scidx($N_{SC}$ − 1) and scidx($N_{SC}$) is $2^j$ |

When Feedback Type is 1 in the Digital Fbck Control field of Table 2 above, the Digital Beamforming Feedback Information field of Table 3 above includes a digital beamforming feedback matrix having an indexed and compressed element. The element is indexed first according to a matrix angle in the order shown in Table 4 below, and is indexed secondly according to a data subcarrier index from the lowest frequency to the highest frequency. Table 27 described in Table 3 above may correspond to Table 4 below.

In case of channel aggregation in which a primary channel and a secondary channel are uniformly divided, the numbers of rows and columns of the beamforming feedback matrix are even numbers. The number of rows of the beamforming feedback matrix of each aggregated channel is Nr/2, and the number of columns of the beamforming feedback matrix of each aggregated channel is Nc/2. Herein, Nr and Nc are indicated respectively by an Nr index subfield and Nc index subfield in the Digital Fbck Control field.

The Digital BF Feedback element has the structure and order defined in Table 3 above, and a value of $n_{bit}$ is a function of a Feedback Type subfield within the Digital Fbck Control field, which will be described Table 7 below. In case of channel aggregation, the value of $n_{bit}$ consists of a feedback bit for each aggregated channel.

If Feedback Type is 1, an order of angle included in the Digital Beamforming Feedback Information field may be defined as shown in the following table.

TABLE 4

| Size of V (Nr × Nc) | Number of angles (Na) | The order of angles in the Compressed Beamforming Feedback Matrix subfield |
|---|---|---|
| 2 × 1 | 2 | φ11, ψ21 |
| 2 × 2 | 2 | φ11, ψ21 |
| 3 × 1 | 4 | φ11, φ21, ψ21, ψ31 |
| 3 × 2 | 6 | φ11, φ21, ψ21, ψ31, φ22, ψ32 |
| 3 × 3 | 6 | φ11, φ21, ψ21, ψ31, φ22, ψ32 |
| 4 × 1 | 6 | φ11, φ21, φ31, ψ21, ψ31, ψ41 |
| 4 × 2 | 10 | φ11, φ21, φ31, ψ21, ψ31, ψ41, φ22, φ32, ψ32, ψ42 |
| 4 × 3 | 12 | φ11, φ21, φ31, ψ21, ψ31, ψ41, φ22, φ32, ψ32, ψ42, φ33, ψ43 |
| 4 × 4 | 12 | φ11, φ21, φ31, ψ21, ψ31, ψ41, φ22, φ32, ψ32, ψ42, φ33, ψ43 |
| 5 × 1 | 8 | φ11, φ21, φ31, φ41, ψ21, ψ31, ψ41, ψ51 |
| 5 × 2 | 14 | φ11, φ21, φ31, φ41, ψ21, ψ31, ψ41, ψ51, φ22, φ32, φ42, ψ32, ψ42, ψ52 |
| 5 × 3 | 18 | φ11, φ21, φ31, φ41, ψ21, ψ31, ψ41, ψ51, φ22, φ32, φ42, ψ32, ψ42, ψ52, φ33, φ43, ψ43, ψ53 |
| 5 × 4 | 20 | φ11, φ21, φ31, φ41, ψ21, ψ31, ψ41, ψ51, φ22, φ32, φ42, ψ32, ψ42, ψ52, φ33, φ43, ψ43, ψ53, φ44, ψ54 |
| 5 × 5 | 20 | φ11, φ21, φ31, φ41, ψ21, ψ31, ψ41, ψ51, φ22, φ32, φ42, ψ32, ψ42, ψ52, φ33, φ43, ψ43, ψ53, φ44, ψ54 |
| 6 × 1 | 10 | φ11, φ21, φ31, φ41, φ51, ψ21, ψ31, ψ41, ψ51, ψ61 |
| 6 × 2 | 18 | φ11, φ21, φ31, φ41, φ51, ψ21, ψ31, ψ41, ψ51, ψ61, φ22, φ32, φ42, φ52, ψ32, ψ42, ψ52, ψ62 |
| 6 × 3 | 24 | φ11, φ21, φ31, φ41, φ51, ψ21, ψ31, ψ41, ψ51, ψ61, φ22, φ32, φ42, φ52, ψ32, ψ42, ψ52, ψ62, φ33, φ43, φ53, ψ43, ψ53, ψ63 |
| 6 × 4 | 28 | φ11, φ21, φ31, φ41, φ51, ψ21, ψ31, ψ41, ψ51, ψ61, φ22, φ32, φ42, φ52, ψ32, ψ42, ψ52, ψ62, φ33, φ43, φ53, ψ43, ψ53, ψ63, φ44, φ54, ψ54, ψ64 |
| 6 × 5 | 30 | φ11, φ21, φ31, φ41, φ51, ψ21, ψ31, ψ41, ψ51, ψ61, φ22, φ32, φ42, φ52, ψ32, ψ42, ψ52, ψ62, φ33, φ43, φ53, ψ43, ψ53, ψ63, φ44, φ54, ψ54, ψ64, φ55, ψ65 |

TABLE 4-continued

| Size of V (Nr × Nc) | Number of angles (Na) | The order of angles in the Compressed Beamforming Feedback Matrix subfield |
|---|---|---|
| 6 × 6 | 30 | φ11, φ21, φ31, φ41, φ51, ψ21, ψ31, ψ41, ψ51, ψ61, φ22, φ32, φ42, φ52, ψ32, ψ42, ψ52, ψ62, φ33, φ43, φ53, ψ43, ψ53, ψ63, φ44, φ54, ψ54, ψ64, φ55, ψ65 |
| 7 × 1 | 12 | φ11, φ21, φ31, φ41, φ51, φ61, ψ21, ψ31, ψ41, ψ51, ψ61, ψ71 |
| 7 × 2 | 22 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72 |
| 7 × 3 | 30 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72, φ33, φ43, φ53, φ63, ψ43, ψ53, ψ63, ψ73 |
| 7 × 4 | 36 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72, φ33, φ43, φ53, φ63, ψ43, ψ53, ψ63, ψ73, φ44, φ54, φ64, ψ54, ψ64, ψ74 |
| 7 × 5 | 40 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72, φ33, φ43, φ53, φ63, ψ43, ψ53, ψ63, ψ73, φ44, φ54, φ64, ψ54, ψ64, ψ74, φ55, φ65, ψ75 |
| 7 × 6 | 42 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72, φ33, φ43, φ53, φ63, ψ43, ψ53, ψ63, ψ73, φ44, φ54, φ64, ψ54, ψ64, ψ74, φ55, φ65, ψ75, φ66, ψ76 |
| 7 × 7 | 42 | φ11, φ21, φ31, φ41, φ51, φ61, ψ21, ψ31, ψ41, ψ51, ψ61, ψ71, φ22, φ32, φ42, φ52, φ62, ψ32, ψ42, ψ52, ψ62, ψ72, φ33, φ43, φ53, φ63, ψ43, ψ53, ψ63, ψ73, φ44, φ54, φ64, ψ54, ψ64, ψ74, φ55, φ65, ψ75, φ66, ψ76 |
| 8 × 1 | 14 | φ11, φ21, φ31, φ41, φ51, φ61, φ71, ψ21, ψ31, ψ41, ψ51, ψ61, ψ71, ψ81 |
| 8 × 2 | 26 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82 |
| 8 × 3 | 36 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83 |
| 8 × 4 | 44 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83, φ44, φ54, φ64, φ74, ψ54, ψ64, ψ74, ψ84 |
| 8 × 5 | 50 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83, φ44, φ54, φ64, φ74, ψ54, ψ64, ψ74, ψ84, φ55, φ65, φ75, ψ65, ψ75, ψ85 |
| 8 × 6 | 54 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83, φ44, φ54, φ64, φ74, ψ54, ψ64, ψ74, ψ84, φ55, φ65, φ75, ψ65, ψ75, ψ85, φ66, φ76, ψ76, ψ86 |
| 8 × 7 | 56 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83, φ44, φ54, φ64, φ74, ψ54, ψ64, ψ74, ψ84, φ55, φ65, φ75, ψ65, ψ75, ψ85, φ66, φ76, ψ76, ψ86, φ77, ψ87 |
| 8 × 8 | 56 | φ11, φ21, φ31, φ41, φ51, φ61, φ71, ψ21, ψ31, ψ41, ψ51, ψ61, ψ71, ψ81, φ22, φ32, φ42, φ52, φ62, φ72, ψ32, ψ42, ψ52, ψ62, ψ72, ψ82, φ33, φ43, φ53, φ63, φ73, ψ43, ψ53, ψ63, ψ73, ψ83, φ44, φ54, φ64, φ74, ψ54, ψ64, ψ74, ψ84, φ55, φ65, φ75, ψ65, ψ75, ψ85, φ66, φ76, ψ76, ψ86, φ77, ψ87 |

In Table 4 above, Nc is the number of columns in the compressed beamforming feedback matrix determined by the Nc Index subfield within the Digital Fbck Control field, and Nr is the number of rows in the compressed beamforming feedback matrix determined by the Nr Index subfield within the Digital Fbck Control field.

The (matrix) angle is quantized as shown in the following table.

TABLE 5

| Quantized Ψ | Quantized φ |
|---|---|
| $\psi = \frac{k\pi}{2^{b_\psi+1}} + \frac{\pi}{2^{b_\psi+2}}$ radians | $\phi = \frac{k\pi}{2^{b_\phi-1}} + \frac{\pi}{2^{b_\phi}}$ radians |
| where: $k = 0, 1, 2, \ldots, 2^{b_\psi} - 1$ $b_\psi$ is the number of bits used to quantize ψ (defined by the Codebook Information field of the MIMO Feedback Control element) | where: $k = 0, 1, 2, \ldots, 2^{b_\phi} - 1$ $b_\phi$ is the number of bits used to quantize φ (defined by the Codebook Information field of the MIMO Feedback Control element) |

4. Proposed Embodiment

The present specification proposes a feedback method when hybrid beamforming is performed in a channel aggregation situation.

There is no conventional hybrid beamforming defined in the channel aggregation situation. When performing digital beamforming, the number of (feedback) bits used for a feedback of channel information in an SC mode and an OFDM mode (Feedback type 0: SC mode, Feedback type 1: OFDM mode) may be defined as follows.

TABLE 6

| Feedback Type | Size (bits) |
| --- | --- |
| 0 | $2 \times 8 \times N_c \times N_r$ |
| 1 | $N_a \times (b_\psi + b_\varphi)/2$, | with $$N_\varphi = \left(N_r \times \frac{N_r + 1}{2} - N_r\right)$$

and $$N_\psi = \left(N_r \times \frac{N_r - 1}{2}\right),$$

$$N_a = N_\psi + N_\varphi$$

Hereinafter, a feedback method in a channel aggregation situation and a signaling method therefor will be proposed.

When normal transmission (transmission other than channel aggregation) is performed, a channel matrix between a transmitting end and a receiving end is configured as a matrix of Nrx by Ntx. For example, if the number of transmit antennas is 4 and the number of receive antennas is 4, the channel matrix is a 4 by 4 matrix.

The number of feedback bits corresponds to 2×8×4×4 bits in case of the SC mode, and corresponds to 12 (referring to Table 4, in case of a 4 by 4 matrix, Na=12)×5 bits in case of the OFDM mode under the assumption that bφ=6 and bψ=4 although it varies depending on quantization.

However, in the channel aggregation situation, a channel experienced at each of 2.16 GHz and 4.32 GHz (2.16 GHz+2.16 GHz or 4.32 GHz+4.32 GHz) may be different.

Figure 17:
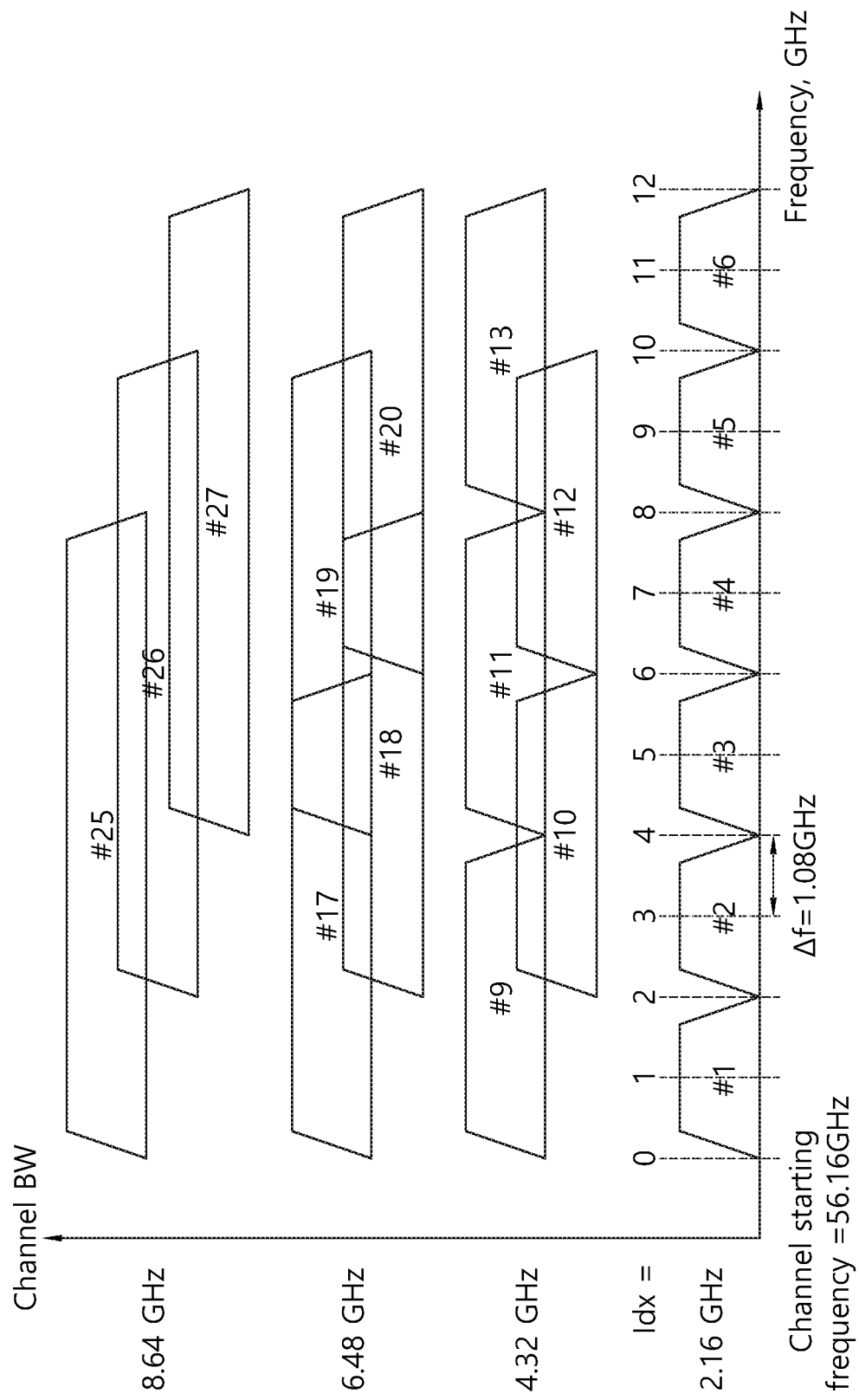
FIG. 17 shows a channel used by an EDMG STA in 802.11ay.

FIG. 17 shows a channel used by an EDMG STA in 802.11ay.

Referring to FIG. 17, although 2.16 GHz is currently defined from #1 to #6, a case of using 2.16 GHz of #7 and #8 in the right of #6 may also be considered.

According to FIG. 17, there may be a situation where an aggregated channel is contiguous (e.g., in case of using the channels of #1 and #2) and a situation where the aggregated channel is non-contiguous (e.g., in case of using the channels of #1 and #6).

Both a case of using a single radio frequency (RF) and a case of using two RFs are considered in each situation. Since two aggregated channels have different frequency bands, channels experienced when data is transmitted are also different.

In addition, in the channel aggregation situation, the number of transmit channels, Ntx, shall be an even number, and a first half thereof is used for transmission of an aggregated channel 1 and the other half thereof is used for transmission of an aggregated channel 2. In other words, for 2.16+2.16 GHz and 4.32+4.32 GHz PPDU transmission, the total number of transmit chains, Ntx, shall be an even number. The first Ntx/2 transmit chains shall be used for transmission on the primary channel and the second Ntx/2 transmit chains shall be used for transmission on the secondary channel.

EMBODIMENT

For 2.16 GHz+2.16 GHz, a case where an aggregated channel 1 uses a 2.16 GHz channel of #1 and an aggregated channel 2 uses a 2.16 GHz channel of #6 will be described for example (see FIG. 17).

Since two aggregated channels have different frequency bands, channels experienced when data is transmitted are also different. As described above, in the channel aggregation situation, the number of transmit channels, Ntx, shall be an even number, and a first half thereof is used for transmission of an aggregated channel 1 and the other half thereof is used for transmission of an aggregated channel 2.

That is, a channel at 2.16 GHz+2.16 GHz is not a channel of 4 by 4 but is configured such that each aggregated channel has a 2 by 2 matrix.

In feedback bits (see Table 5) currently defined, a size of a feedback matrix is a primary factor. Therefore, if the feedback is achieved in a currently defined manner, unnecessarily many bits are fed back.

That is, a method proposed in the present specification feeds back only channel information of each aggregated channel.

Conventionally, the number of feedback bits corresponds to 2×8×4×4=256 bits in case of the SC mode, and corresponds to 12 (referring to Table 4, in case of a 4 by 4 matrix, Na=12)×5 bits=60 bits in case of the OFDM mode under the assumption that bφ=6 and bψ=4.

However, when using the method proposed in the present specification, the number of feedback bits corresponds to 2×8×2×2 (for aggregated channel 1)+2×8×2×2 (for aggregated channel 2)=128 bits in case of the SC mode, and corresponds to 2 (referring to Table 4, in case of a 2 by 2 matrix, Na=2)×5=10 bits in case of the OFDM mode.

According to the proposed method, in case of the SC mode, advantageously, the number of feedback bits can be decreased by half. In case of the OFDM mode, advantageously, the number of feedback bits can be decreased compared to the conventional method, although a ratio of the decrease varies depending on a value Na.

A decreased feedback bit rate may vary depending on the number of transmit antennas and the number of receive antennas. Hereinafter, a method is proposed in which a feedback bit is given differently according to whether there is channel aggregation in the conventional format.

1) In case of Feedback Type 0 if channel aggregation is applied, 2×8×(Nc/2)×(Nr/2) for each aggregated channel if channel aggregation is not applied, 2×8×Nc×Nr 2) In case of Feedback Type 1 if channel aggregation is applied, Na×(bφ+bψ)/2 for each aggregated channel if channel aggregation is not applied, Na×(bφ+bψ)/2

The proposed method may be summarized as defined in the following table.

TABLE 7

| Feedback Type | $n_{bit}$ size (bits) | | |
|---|---|---|---|
| subfield value | 2.16 GHz, 4.32 GHz, 6.48 GHz, or 8.64 GHz channel | 2.16 + 2.16 GHz or 4.32 + 4.32 GHz channel | |
| 0 | $2 \times 8 \times N_c \times N_r$ | $2 \times 8 \times (N_c/2) \times (N_r/2)$ | 2.16 GHz or 4.32 GHz channel containing the primary channel |
|  |  | $2 \times 8 \times (N_c/2) \times (N_r/2)$ | 2.16 GHz or 4.32 GHz channel not containing the primary channel |
| 1 | $N_a \times (b_\psi + b_\varphi)/2$, with $N_\varphi = \left(N_r \times \frac{N_r+1}{2} - N_r\right)$ and $N_\psi = \left(N_r \times \frac{N_r-1}{2}\right)$, $N_a = N_\psi + N_\varphi$ | $N_a \times (b_\psi + b_\varphi)/2$, with $N_\varphi = \left((N_r/2) \times \frac{(N_r/2)+1}{2} - (N_r/2)\right)$ and $N_\psi = \left((N_r/2) \times \frac{(N_r/2)-1}{2}\right)$, $N_a = N_\psi + N_\varphi$ | 2.16 GHz or 4.32 GHz channel containing the primary channel |
|  |  | $N_a \times (b_\psi + b_\varphi)/2$ | 2.16 GHz or 4.32 GHz channel not containing the primary channel |

For example, when the TRN field is transmitted in the channel aggregation situation, Feedback Type is defined in the conventional Digital Fbck Control field. If it is 0, a time domain uncompressed feedback may be achieved in the SC mode, and if it is 1, a frequency domain compressed feedback may be achieved in the OFDM mode.

According to the feedback type, the feedback is achieved by $n_{bit}$ in the conventional Digital BF Feedback element, and the value $n_{bit}$ may change as follows.

Whether the channel aggregation is applied may be added as shown in the following table (if channel aggregation is applied, if channel aggregation is not applied).

TABLE 8

| Feedback Type | Size (bits) |
|---|---|
| 0 | If channel aggregation is not applied, $2 \times 8 \times N_c \times N_r$ If channel aggregation is applied, $2 \times 8 \times (N_c/2) \times (N_r/2)$ for each aggregated channel |
| 1 | If channel aggregation is not applied, $N_a \times (b_\psi + b_\varphi)/2$ If channel aggregation is applied, $N_a \times (b_\psi + b_\varphi)/2$ for each aggregated channel with $N_\varphi = \left(N_r \times \frac{N_r+1}{2} - N_r\right)$ and $N_\psi = \left(N_r \times \frac{N_r-1}{2}\right)$, $N_a = N_\psi + N_\varphi$ |

Alternatively, whether the channel aggregation is applied may be confirmed as shown in the following table by utilizing a channel aggregation field in EDMG-Header-A.

TABLE 9

| Feedback Type | Size (bits) |
|---|---|
| 0 | If channel aggregation field in EDMG Header-A is set to 0, $2 \times 8 \times N_c \times N_r$ If channel aggregation field in EDMG Header-A is set to 0, $2 \times 8 \times \left(\frac{N_c}{2}\right) \times \left(\frac{N_r}{2}\right)$ for each aggregated channel |
| 1 | If channel aggregation field in EDMG Header-A is set to 0, $N_a \times (b_\psi + b_\varphi)/2$ If channel aggregation field in EDMG Header-A is set to 1, $N_a \times (b_\psi + b_\varphi)/2$ for each aggregated channel with $N_\varphi = \left(N_r \times \frac{N_r+1}{2} - N_r\right)$ and $N_\psi = \left(N_r \times \frac{N_r-1}{2}\right)$, $N_a = N_\psi + N_\varphi$ |

In addition to the above method, whether the channel aggregation is applied in announcement and sounding operations may be reported during a hybrid beamforming procedure.

A feedback bit may be configured as follows by distinguishing a case where TRN is transmitted by performing BRP or beam tracking when in the channel aggregation situation and a case where TRN is transmitted by performing BRP or beam tracking when not in the channel aggregation situation.

TABLE 10

| Feedback Type | Size (bits) |
|---|---|
| 0 | If the TRN fields are sent during BRP phase or beam tracking phase, $2 \times 8 \times N_c \times N_r$ |

TABLE 10-continued

| Feedback Type | Size (bits) |
|---|---|
| | If the TRN fields are sent during BRP phase or beam tracking phase in case of channel aggregation, $2 \times 8 \times \left(\frac{N_c}{2}\right) \times \left(\frac{N_r}{2}\right)$ for aggregated channel |
| 1 | If the TRN fields are sent during BRP phase or beam tracking phase, $N_a \times (b_\psi + b_\varphi)/2$<br>If the TRN fields are sent during BRP phase or beam tracking phase in case of channel aggregation, $N_a \times (b_\psi + b_\varphi)/2$ for each aggregated channel<br>with $N_\varphi = \left(N_r \times \frac{N_r+1}{2} - N_r\right)$ and $N_\psi = \left(N_r \times \frac{N_r-1}{2}\right)$, $N_a = N_\psi + N_\varphi$ |

That is, according to the proposed method described above, bits to be fed back when performing digital beamforming can be decreased, thereby having an effect of improving system performance.

Figure 18:
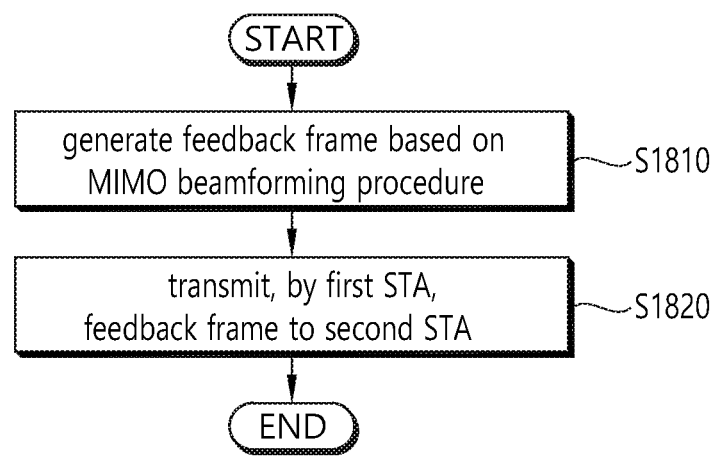
FIG. 18 is a flowchart showing a procedure of transmitting a feedback frame in order for a transmitting device to perform MIMO beamforming according to the present embodiment.

FIG. 18 is a flowchart showing a procedure of transmitting a feedback frame in order for a transmitting device to perform MIMO beamforming according to the present embodiment.

In the present embodiment, a hybrid beamforming procedure in a channel aggregation situation is defined. Specifically, a method is proposed in which the number of bits used for a feedback of channel information is defined in a channel aggregation situation by distinguishing an SC mode and an OFDM mode when performing digital beamforming.

First, summarizing terminologies, a first STA may correspond to a responder performing MIMO beamforming, and a second STA may correspond to an initiator performing MIMO beamforming. The MIMO beamforming described in the present embodiment may correspond to single user (SU)-MIMO beamforming if the first STA is a single device, and may correspond to multi-user (MU)-MIMO beamforming if the first STA is a plurality of devices.

In step S1810, the first STA generates a feedback frame based on a MIMO beamforming procedure. The MIMO beamforming procedure may also include a sounding procedure for transmitting/receiving a BRP (beam refinement protocol or beam refinement phase) packet.

In step S1820, the first STA transmits the feedback frame to the second STA.

The frame feedback may be defined as follows.

The feedback frame is transmitted through an aggregated channel in which a first channel and a second channel are aggregated. The feedback frame includes a first beamforming feedback matrix transmitted on the first channel and a second beamforming feedback matrix transmitted on the second channel. That is, a beamforming feedback matrix may be defined for each aggregated channel.

When the feedback frame is not transmitted through the aggregated channel, the feedback frame includes a third beamforming feedback matrix. That is, in case of normal transmission other than channel aggregation, the feedback frame may include the third beamforming feedback matrix.

In this case, the number Nc of columns of the third beamforming feedback matrix and the number Nr of rows are determined based on the total number of spatial streams supported by the first STA. The spatial stream may be determined based on a transmit antenna or transmit chain supported by the first STA, or may be determined based on a receive antenna or receive chain supported by the second STA.

The first beamforming feedback matrix transmitted on the first channel and the second beamforming feedback matrix transmitted on the second channel are configured as follows.

The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2. In this case, Nc and Nr are even numbers.

That is, the present embodiment proposes a method in which a size of the first beamforming feedback matrix transmitted on the first channel and a size of the second beamforming feedback matrix transmitted on the second channel are set to half of a size of the third beamforming feedback matrix. In other words, the present embodiment proposes a method in which a first half of the number of transmit channels supported by the first STA is used for transmission of the first channel, and the other half of the number of transmit chains supported by the first STA is used for transmission of the second channel. Since the half is used, the number of transmit chains, the number of spatial streams, the number of columns of the first and second beamforming feedback matrixes, and the number of rows of the first and second beamforming feedback matrixes shall be even numbers.

The number of feedback bits of the first and second beamforming feedback matrixes may be determined based on a feedback type.

If the feedback type is a single carrier (SC) mode, the number of feedback bits of the first beamforming feedback matrix may be 2×8×(Nc/2)×(Nr/2). The number of feedback bits of the second beamforming feedback matrix may be 2×8×(Nc/2)×(Nr/2). That is, the number of feedback bits can be decreased by decreasing the size of the feedback matrix by using Nc/2 and Nr/2.

If the feedback type is an orthogonal frequency division multiplexing (OFDM) mode, the number of feedback bits of the first beamforming feedback matrix may be Na×(bφ+bψ)/2. The number of feedback bits of the second beamforming feedback matrix may be Na×(bφ+bψ)/2. Na is the number of matrix angles of the first and second beamforming feedback matrixes. bφ and bψ are the number of bits for quantizing the matrix angles.

Na varies depending on the size of the beamforming feedback matrix. In general, when the size of the beamforming feedback matrix is small, the value of Na may also be small. That is, the size of the feedback matrix is decreased by using Nc/2 and Nr/2, and thus the value of Na is also decreased, thereby decreasing the number of feedback bits.

bφ may be the number of bits used to quantize φ defined by a Codebook Information field included in a MIMO Feedback Control element. bψ may be the number of bits used to quantize ψ defined by the Codebook Information field included in the MIMO Feedback Control element.

A subfield for the feedback type may be included in a Digital Fbck Control field.

If the feedback type is an SC mode, the first and second beamforming feedback matrixes may be feedback matrixes which are not compressed in a time domain.

If the feedback type is an OFDM mode, the first and second beamforming feedback matrixes may be feedback matrixes which are compressed in a frequency domain.

Nc may be determined based on an Nc index subfield in the Digital Fbck Control field. Nr may be determined based on an Nr index subfield in the Digital Fbck Control field.

The first channel may be 2.16 GHz and the second channel may be 2.16 GHz (2.16 GHz+2.16 GHz). Alternatively, the first channel may be 4.32 GHz and the second channel may be 4.32 GHz (4.32 GHz+4.32 GHz). The first channel and the second channel have different bands. The first channel and the second channel may be contiguous or non-contiguous to each other.

Figure 19:
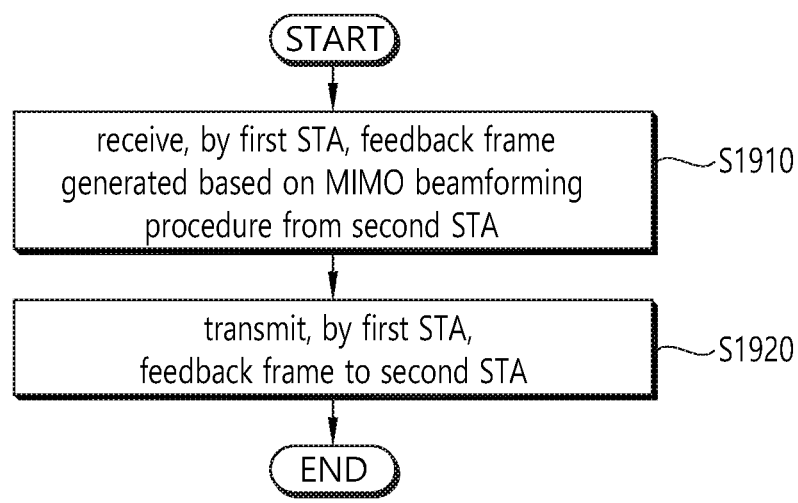
FIG. 19 is a flowchart showing a procedure of receiving a feedback frame in order for a receiving device to perform MIMO beamforming according to the present embodiment.

FIG. 19 is a flowchart showing a procedure of receiving a feedback frame in order for a receiving device to perform MIMO beamforming according to the present embodiment.

In the present embodiment, a hybrid beamforming procedure in a channel aggregation situation is defined. Specifically, a method is proposed in which the number of bits used for a feedback of channel information is defined in a channel aggregation situation by distinguishing an SC mode and an OFDM mode when performing digital beamforming.

First, summarizing terminologies, a first STA may correspond to an initiator performing MIMO beamforming, and a second STA may correspond to a responder performing MIMO beamforming. The MIMO beamforming described in the present embodiment may correspond to single user (SU)-MIMO beamforming if the second STA is one device, and may correspond to multi-user (MU)-MIMO beamforming if the second STA is a plurality of devices.

In step S1910, the first STA receives a feedback frame generated based on a MIMO beamforming procedure. The MIMO beamforming procedure may also include a sounding procedure for transmitting/receiving a BRP (beam refinement protocol or beam refinement phase) packet.

In step S1920, the first STA transmits the feedback frame to the second STA based on the feedback frame.

The frame feedback may be defined as follows.

The feedback frame is transmitted through an aggregated channel in which a first channel and a second channel are aggregated. The feedback frame includes a first beamforming feedback matrix transmitted on the first channel and a second beamforming feedback matrix transmitted on the second channel. That is, a beamforming feedback matrix may be defined for each aggregated channel.

When the feedback frame is not transmitted through the aggregated channel, the feedback frame includes a third beamforming feedback matrix. That is, in case of normal transmission other than channel aggregation, the feedback frame may include the third beamforming feedback matrix.

In this case, the number Nc of columns of the third beamforming feedback matrix and the number Nr of rows are determined based on the total number of spatial streams supported by the first STA. The spatial stream may be determined based on a transmit antenna or transmit chain supported by the first STA, or may be determined based on a receive antenna or receive chain supported by the second STA.

The first beamforming feedback matrix transmitted on the first channel and the second beamforming feedback matrix transmitted on the second channel are configured as follows.

The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2. In this case, Nc and Nr are even numbers.

That is, the present embodiment proposes a method in which a size of the first beamforming feedback matrix transmitted on the first channel and a size of the second beamforming feedback matrix transmitted on the second channel are set to half of a size of the third beamforming feedback matrix. In other words, the present embodiment proposes a method in which a first half of the number of transmit channels supported by the first STA is used for transmission of the first channel, and the other half of the number of transmit chains supported by the first STA is used for transmission of the second channel. Since the half is used, the number of transmit chains, the number of spatial streams, the number of columns of the first and second beamforming feedback matrixes, and the number of rows of the first and second beamforming feedback matrixes shall be even numbers.

The number of feedback bits of the first and second beamforming feedback matrixes may be determined based on a feedback type.

If the feedback type is a single carrier (SC) mode, the number of feedback bits of the first beamforming feedback matrix may be 2×8×(Nc/2)×(Nr/2). The number of feedback bits of the second beamforming feedback matrix may be 2×8×(Nc/2)×(Nr/2). That is, the number of feedback bits can be decreased by decreasing the size of the feedback matrix by using Nc/2 and Nr/2.

If the feedback type is an orthogonal frequency division multiplexing (OFDM) mode, the number of feedback bits of the first beamforming feedback matrix may be Na×(bφ+bψ)/2. The number of feedback bits of the second beamforming feedback matrix may be Na×(bφ+bψ)/2. Na is the number of matrix angles of the first and second beamforming feedback matrixes. bφ and bψ are the number of bits for quantizing the matrix angles.

Na varies depending on the size of the beamforming feedback matrix. In general, when the size of the beamforming feedback matrix is small, the value of Na may also be small. That is, the size of the feedback matrix is decreased by using Nc/2 and Nr/2, and thus the value of Na is also decreased, thereby decreasing the number of feedback bits.

bφ may be the number of bits used to quantize φ defined by a Codebook Information field included in a MIMO Feedback Control element. bψ may be the number of bits used to quantize ψ defined by the Codebook Information field included in the MIMO Feedback Control element.

A subfield for the feedback type may be included in a Digital Fbck Control field.

If the feedback type is an SC mode, the first and second beamforming feedback matrixes may be feedback matrixes which are not compressed in a time domain.

If the feedback type is an OFDM mode, the first and second beamforming feedback matrixes may be feedback matrixes which are compressed in a frequency domain.

Nc may be determined based on an Nc index subfield in the Digital Fbck Control field. Nr may be determined based on an Nr index subfield in the Digital Fbck Control field.

The first channel may be 2.16 GHz and the second channel may be 2.16 GHz (2.16 GHz+2.16 GHz). Alternatively, the first channel may be 4.32 GHz and the second channel may be 4.32 GHz (4.32 GHz+4.32 GHz). The first channel and the second channel have different bands. The first channel and the second channel may be contiguous or non-contiguous to each other.

Figure 20:
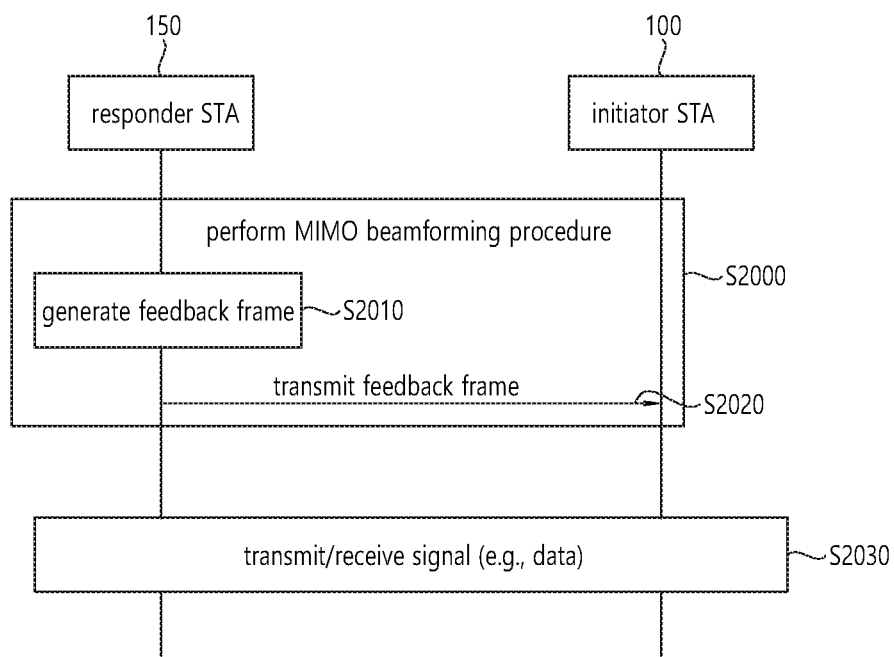
FIG. 20 is a flowchart showing a procedure of transmitting a feedback frame to perform MIMO beamforming according to the present embodiment.

FIG. 20 is a flowchart showing a procedure of transmitting a feedback frame to perform MIMO beamforming according to the present embodiment.

First, summarizing terminologies, a first STA may correspond to a responder performing MIMO beamforming, and a second STA may correspond to an initiator performing MIMO beamforming. The MIMO beamforming described in the present embodiment may correspond to single user (SU)-MIMO beamforming if the first STA is a single device, and may correspond to multi-user (MU)-MIMO beamforming if the first STA is a plurality of devices.

In step S2000, the first STA performs a MIMO beamforming procedure together with the second STA. The MIMO beamforming procedure may include steps S2010 and S2020.

In step S2010, the first STA generates a feedback frame based on a MIMO beamforming procedure. The MIMO beamforming procedure may also include a sounding procedure for transmitting/receiving a BRP (beam refinement protocol or beam refinement phase) packet.

In step S2020, the first STA transmits the feedback frame to the second STA.

In step S2030, the first STA transmits/receives a signal (or data) based on the MIMO beamforming procedure.

The frame feedback may be defined as follows.

The feedback frame is transmitted through an aggregated channel in which a first channel and a second channel are aggregated. The feedback frame includes a first beamforming feedback matrix transmitted on the first channel and a second beamforming feedback matrix transmitted on the second channel. That is, a beamforming feedback matrix may be defined for each aggregated channel.

When the feedback frame is not transmitted through the aggregated channel, the feedback frame includes a third beamforming feedback matrix. That is, in case of normal transmission other than channel aggregation, the feedback frame may include the third beamforming feedback matrix.

In this case, the number Nc of columns of the third beamforming feedback matrix and the number Nr of rows are determined based on the total number of spatial streams supported by the first STA. The spatial stream may be determined based on a transmit antenna or transmit chain supported by the first STA, or may be determined based on a receive antenna or receive chain supported by the second STA.

The first beamforming feedback matrix transmitted on the first channel and the second beamforming feedback matrix transmitted on the second channel are configured as follows.

The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2. In this case, Nc and Nr are even numbers.

That is, the present embodiment proposes a method in which a size of the first beamforming feedback matrix transmitted on the first channel and a size of the second beamforming feedback matrix transmitted on the second channel are set to half of a size of the third beamforming feedback matrix. In other words, the present embodiment proposes a method in which a first half of the number of transmit channels supported by the first STA is used for transmission of the first channel, and the other half of the number of transmit chains supported by the first STA is used for transmission of the second channel. Since the half is used, the number of transmit chains, the number of spatial streams, the number of columns of the first and second beamforming feedback matrixes, and the number of rows of the first and second beamforming feedback matrixes shall be even numbers.

The number of feedback bits of the first and second beamforming feedback matrixes may be determined based on a feedback type.

If the feedback type is a single carrier (SC) mode, the number of feedback bits of the first beamforming feedback matrix may be 2×8×(Nc/2)×(Nr/2). The number of feedback bits of the second beamforming feedback matrix may be 2×8×(Nc/2)×(Nr/2). That is, the number of feedback bits can be decreased by decreasing the size of the feedback matrix by using Nc/2 and Nr/2.

If the feedback type is an orthogonal frequency division multiplexing (OFDM) mode, the number of feedback bits of the first beamforming feedback matrix may be Na×(bφ+bψ)/2. The number of feedback bits of the second beamforming feedback matrix may be Na×(bφ+bψ)/2. Na is the number of matrix angles of the first and second beamforming feedback matrixes. bφ and bψ are the number of bits for quantizing the matrix angles.

Na varies depending on the size of the beamforming feedback matrix. In general, when the size of the beamforming feedback matrix is small, the value of Na may also be small. That is, the size of the feedback matrix is decreased by using Nc/2 and Nr/2, and thus the value of Na is also decreased, thereby decreasing the number of feedback bits.

bφ may be the number of bits used to quantize φ defined by a Codebook Information field included in a MIMO Feedback Control element. bψ may be the number of bits used to quantize ψ defined by the Codebook Information field included in the MIMO Feedback Control element.

A subfield for the feedback type may be included in a Digital Fbck Control field.

If the feedback type is an SC mode, the first and second beamforming feedback matrixes may be feedback matrixes which are not compressed in a time domain.

If the feedback type is an OFDM mode, the first and second beamforming feedback matrixes may be feedback matrixes which are compressed in a frequency domain.

Nc may be determined based on an Nc index subfield in the Digital Fbck Control field. Nr may be determined based on an Nr index subfield in the Digital Fbck Control field.

The first channel may be 2.16 GHz and the second channel may be 2.16 GHz (2.16 GHz+2.16 GHz). Alternatively, the first channel may be 4.32 GHz and the second channel may be 4.32 GHz (4.32 GHz+4.32 GHz). The first channel and the second channel have different bands. The first channel and the second channel may be contiguous or non-contiguous to each other.

5. Device Configuration

Figure 21:
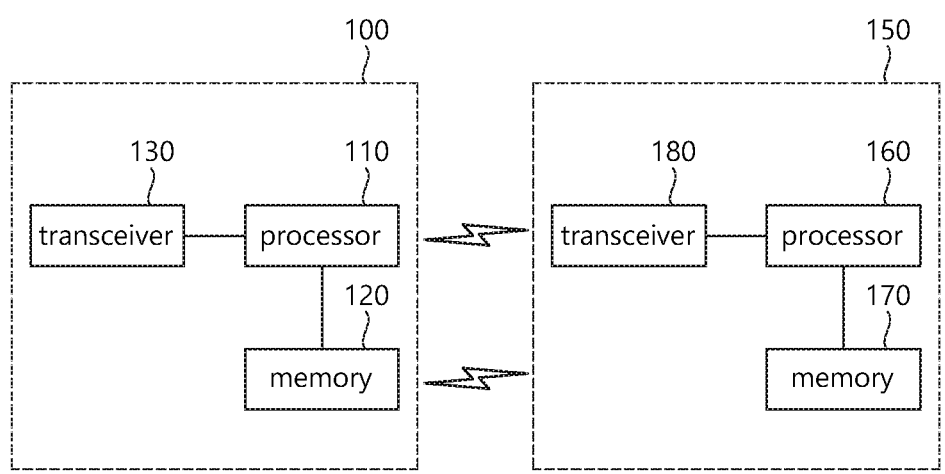
FIG. 21 is a diagram showing a device for implementing the above-described method.

FIG. 21 is a diagram describing a device for implementing the above-described method.

A wireless device (100) of FIG. 21 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement functions, processes, and/or methods proposed in the present specification. For example, the processor (110, 160) may perform the aforementioned operation according to the present embodiment.

Specifically, the processor 110 of the transmitting device operates as follows. The processor 110 of the transmitting device generates a feedback frame based on a multi input multi output (MIMO) beamforming procedure, and transmits the feedback frame.

Specifically, the processor 160 of the receiving device operates as follows. The processor 160 of the receiving device receives a feedback frame generated in the transmitting device, and transmits data based on the received feedback frame.

The frame feedback may be defined as follows.

The feedback frame is transmitted through an aggregated channel in which a first channel and a second channel are aggregated. The feedback frame includes a first beamforming feedback matrix transmitted on the first channel and a second beamforming feedback matrix transmitted on the second channel. That is, a beamforming feedback matrix may be defined for each aggregated channel.

When the feedback frame is not transmitted through the aggregated channel, the feedback frame includes a third beamforming feedback matrix. That is, in case of normal transmission other than channel aggregation, the feedback frame may include the third beamforming feedback matrix.

In this case, the number Nc of columns of the third beamforming feedback matrix and the number Nr of rows are determined based on the total number of spatial streams supported by the first STA. The spatial stream may be determined based on a transmit antenna or transmit chain supported by the first STA, or may be determined based on a receive antenna or receive chain supported by the second STA.

The first beamforming feedback matrix transmitted on the first channel and the second beamforming feedback matrix transmitted on the second channel are configured as follows.

The number of columns of the first beamforming feedback matrix is set to Nc/2, and the number of rows of the first beamforming feedback matrix is set to Nr/2. The number of columns of the second beamforming feedback matrix is set to Nc/2, and the number of rows of the second beamforming feedback matrix is set to Nr/2. In this case, Nc and Nr are even numbers.

That is, the present embodiment proposes a method in which a size of the first beamforming feedback matrix transmitted on the first channel and a size of the second beamforming feedback matrix transmitted on the second channel are set to half of a size of the third beamforming feedback matrix. In other words, the present embodiment proposes a method in which a first half of the number of transmit channels supported by the first STA is used for transmission of the first channel, and the other half of the number of transmit chains supported by the first STA is used for transmission of the second channel. Since the half is used, the number of transmit chains, the number of spatial streams, the number of columns of the first and second beamforming feedback matrixes, and the number of rows of the first and second beamforming feedback matrixes shall be even numbers.

The number of feedback bits of the first and second beamforming feedback matrixes may be determined based on a feedback type.

If the feedback type is a single carrier (SC) mode, the number of feedback bits of the first beamforming feedback matrix may be $2 \times 8 \times (Nc/2) \times (Nr/2)$. The number of feedback bits of the second beamforming feedback matrix may be $2 \times 8 \times (Nc/2) \times (Nr/2)$. That is, the number of feedback bits can be decreased by decreasing the size of the feedback matrix by using Nc/2 and Nr/2.

If the feedback type is an orthogonal frequency division multiplexing (OFDM) mode, the number of feedback bits of the first beamforming feedback matrix may be $Na \times (b\varphi + b\psi)/2$. The number of feedback bits of the second beamforming feedback matrix may be $Na \times (b\varphi + b\psi)/2$. Na is the number of matrix angles of the first and second beamforming feedback matrixes. $b\varphi$ and $b\psi$ are the number of bits for quantizing the matrix angles.

Na varies depending on the size of the beamforming feedback matrix. In general, when the size of the beamforming feedback matrix is small, the value of Na may also be small. That is, the size of the feedback matrix is decreased by using Nc/2 and Nr/2, and thus the value of Na is also decreased, thereby decreasing the number of feedback bits.

$b\varphi$ may be the number of bits used to quantize $\varphi$ defined by a Codebook Information field included in a MIMO Feedback Control element. $b\psi$ may be the number of bits used to quantize $\psi$ defined by the Codebook Information field included in the MIMO Feedback Control element.

A subfield for the feedback type may be included in a Digital Fbck Control field.

If the feedback type is an SC mode, the first and second beamforming feedback matrixes may be feedback matrixes which are not compressed in a time domain.

If the feedback type is an OFDM mode, the first and second beamforming feedback matrixes may be feedback matrixes which are compressed in a frequency domain.

Nc may be determined based on an Nc index subfield in the Digital Fbck Control field. Nr may be determined based on an Nr index subfield in the Digital Fbck Control field.

The first channel may be 2.16 GHz and the second channel may be 2.16 GHz (2.16 GHz+2.16 GHz). Alternatively, the first channel may be 4.32 GHz and the second channel may be 4.32 GHz (4.32 GHz+4.32 GHz). The first channel and the second channel have different bands. The first channel and the second channel may be contiguous or non-contiguous to each other.

What is claimed is:

1. A method of transmitting a feedback frame in a wireless LAN (WLAN) system, the method comprising:
generating, by a first station (STA), the feedback frame based on a multi input multi output (MIMO) beamforming procedure; and
transmitting, by the first STA, the feedback frame to a second STA,
wherein the feedback frame is transmitted through an aggregated channel in which a first channel and a second channel are aggregated,
wherein the feedback frame comprises a first beamforming feedback matrix transmitted on the first channel and a second beamforming feedback matrix transmitted on the second channel,
wherein the feedback frame comprises a third beamforming feedback matrix when the feedback frame is not transmitted through the aggregated channel,
wherein the number of columns of the third beamforming feedback matrix is set to Nc, the number of rows of the third beamforming feedback matrix is set to Nr, and Nc is determined based on a total number of spatial streams supported by the first STA,
wherein the number of columns of the first beamforming feedback matrix is set to Nc/2, and the number of rows of the first beamforming feedback matrix is set to Nr/2,
wherein the number of columns of the second beamforming feedback matrix is set to Nc/2, and the number of rows of the second beamforming feedback matrix is set to Nr/2, and
wherein Nc and Nr are even numbers.

2. The method of claim 1,
wherein a number of feedback bits of the first and second beamforming feedback matrixes is determined based on a feedback type, and
wherein if the feedback type is a single carrier (SC) mode, the number of feedback bits of the first beamforming feedback matrix is $2 \times 8 \times (Nc/2) \times (Nr/2)$, and
the number of feedback bits of the second beamforming feedback matrix is $2 \times 8 \times (Nc/2) \times (Nr/2)$.

3. The method of claim 2, wherein if the feedback type is an orthogonal frequency division multiplexing (OFDM) mode,
the number of feedback bits of the first beamforming feedback matrix is $Na \times (b\varphi + b\psi)/2$,
the number of feedback bits of the second beamforming feedback matrix is $Na \times (b\varphi + b\psi)/2$,
Na is a number of matrix angles of the first and second beamforming feedback matrixes, and
$b\varphi$ and $b\psi$ are a number of bits for quantizing the matrix angles.

4. The method of claim 2,
wherein a subfield for the feedback type is comprised in a digital feedback control field,
wherein if the feedback type is an SC mode, the first and second beamforming feedback matrixes are feedback matrixes which are not compressed in a time domain,
wherein if the feedback type is an OFDM mode, the first and second beamforming feedback matrixes are feedback matrixes which are compressed in a frequency domain,
wherein Nc is determined based on an Nc index subfield in the digital feedback control field, and
wherein Nr is determined based on an Nr index subfield in the digital feedback control field.

5. The method of claim 1,
wherein the first channel is 2.16 GHz and the second channel is 2.16 GHz, or
wherein the first channel is 4.32 GHz and the second channel is 4.32 GHz,
wherein the first channel and the second channel have different bands, and
wherein the first channel and the second channel are contiguous or non-contiguous to each other.

6. The method of claim 1, wherein the spatial stream is determined based on a transmit antenna or transmit chain supported by the first STA, or is determined based on a receive antenna or receive chain supported by the second STA.

7. The method of claim 1, wherein Nr is determined based on the total number of spatial streams supported by the first STA.

8. A station (STA) for transmitting a feedback frame in a wireless LAN (WLAN) system, the STA device comprising:
a transceiver having one or more radio frequency (RF) chains and configured to transmit/receive a signal with respect to a different STA; and
a processor operatively coupled to the transceiver to process the signal transmitted/received with respect to the different STA,
wherein the processor is configured to:
generate the feedback frame based on a multi input multi output (MIMO) beamforming procedure; and
transmit the feedback frame to the different STA,
wherein the feedback frame is transmitted through an aggregated channel in which a first channel and a second channel are aggregated,
wherein the feedback frame comprises a first beamforming feedback matrix transmitted on the first channel and a second beamforming feedback matrix transmitted on the second channel,
wherein the feedback frame comprises a third beamforming feedback matrix when the feedback frame is not transmitted through the aggregated channel,
wherein the number of columns of the third beamforming feedback matrix is set to Nc, the number of rows of the third beamforming feedback matrix is set to Nr, and Nc is determined based on a total number of spatial streams supported by the STA,
wherein the number of columns of the first beamforming feedback matrix is set to Nc/2, and the number of rows of the first beamforming feedback matrix is set to Nr/2,
wherein the number of columns of the second beamforming feedback matrix is set to Nc/2, and the number of rows of the second beamforming feedback matrix is set to Nr/2, and
wherein Nc and Nr are even numbers.

9. The STA of claim 8,
wherein a number of feedback bits of the first and second beamforming feedback matrixes is determined based on a feedback type, and
wherein if the feedback type is a single carrier (SC) mode, the number of feedback bits of the first beamforming feedback matrix is $2 \times 8 \times (Nc/2) \times (Nr/2)$, and
the number of feedback bits of the second beamforming feedback matrix is $2 \times 8 \times (Nc/2) \times (Nr/2)$.

10. The STA of claim 9, wherein if the feedback type is an orthogonal frequency division multiplexing (OFDM) mode,
the number of feedback bits of the first beamforming feedback matrix is $Na \times (b\varphi + b\psi)/2$,
the number of feedback bits of the second beamforming feedback matrix is $Na \times (b\varphi + b\psi)/2$, Na is a number of matrix angles of the first and second beamforming feedback matrixes, and b$\varphi$ and b$\psi$ are a number of bits for quantizing the matrix angles.

11. The STA of claim 9, wherein a subfield for the feedback type is comprised in a digital feedback control field, wherein if the feedback type is an SC mode, the first and second beamforming feedback matrixes are feedback matrixes which are not compressed in a time domain, wherein if the feedback type is an OFDM mode, the first and second beamforming feedback matrixes are feedback matrixes which are compressed in a frequency domain, wherein Nc is determined based on an Nc index subfield in the digital feedback control, and wherein Nr is determined based on an Nr index subfield in the digital feedback control.

12. The STA of claim 8, wherein the first channel is 2.16 GHz and the second channel is 2.16 GHz, or wherein the first channel is 4.32 GHz and the second channel is 4.32 GHz, wherein the first channel and the second channel have different bands, and wherein the first channel and the second channel are contiguous or non-contiguous to each other.

13. The STA of claim 8, wherein the spatial stream is determined based on a transmit antenna or transmit chain supported by the STA, or is determined based on a receive antenna or receive chain supported by the different STA.

14. The STA of claim 8, wherein Nr is determined based on the total number of spatial streams supported by the STA.

15. A method of receiving a feedback frame in a wireless LAN (WLAN) system, the method comprising:

receiving, by a first station (STA), the feedback frame generated based on a multi input multi output (MIMO) beamforming procedure from a second STA; and transmitting, by the first STA, data to the second STA based on the feedback frame, wherein the feedback frame is transmitted through an aggregated channel in which a first channel and a second channel are aggregated, wherein the feedback frame comprises a first beamforming feedback matrix transmitted on the first channel and a second beamforming feedback matrix transmitted on the second channel, wherein the feedback frame comprises a third beamforming feedback matrix when the feedback frame is not transmitted through the aggregated channel, wherein the number of columns of the third beamforming feedback matrix is set to Nc, the number of rows of the third beamforming feedback matrix is set to Nr, and Nc is determined based on a total number of spatial streams supported by the first STA, wherein the number of columns of the first beamforming feedback matrix is set to Nc/2, and the number of rows of the first beamforming feedback matrix is set to Nr/2, wherein the number of columns of the second beamforming feedback matrix is set to Nc/2, and the number of rows of the second beamforming feedback matrix is set to Nr/2, and wherein Nc and Nr are even numbers.

* * * * *